US012722995B2

(12) United States Patent
Cosneau et al.

(10) Patent No.: US 12,722,995 B2
(45) Date of Patent: Sep. 1, 2026

(54) METHOD AND MACHINE FOR CONTROLLING A FORMING METHOD

(71) Applicant: TIAMA, Vourles (FR)

(72) Inventors: Laurent Cosneau, Soucieu-en-Jarrest (FR); Olivier Colle, Oullins (FR)

(73) Assignee: TIAMA, Vourles (FR)

( * ) Notice: Subject to any disclaimer, the term of this patent is extended or adjusted under 35 U.S.C. 154(b) by 1076 days.

(21) Appl. No.: 16/770,654

(22) PCT Filed: Dec. 6, 2018

(86) PCT No.: PCT/FR2018/053140

§ 371 (c)(1),
(2) Date: Jun. 8, 2020

(87) PCT Pub. No.: WO2019/110941

PCT Pub. Date: Jun. 13, 2019

(65) Prior Publication Data

US 2020/0299169 A1 Sep. 24, 2020

(30) Foreign Application Priority Data

Dec. 8, 2017 (FR) ..................................... 17 61865

(51) Int. Cl.
*G07C 3/14* (2006.01)
*C03B 9/193* (2006.01)
(Continued)

(52) U.S. Cl.
CPC .............. *C03B 9/1932* (2013.01); *C03B 9/41* (2013.01); *G07C 3/14* (2013.01); *G07C 3/143* (2013.01);
(Continued)

(58) Field of Classification Search
None
See application file for complete search history.

(56) References Cited

U.S. PATENT DOCUMENTS 9,671,357 B2 * 6/2017 Holtkamp ............... G01J 5/025
9,803,974 B2 * 10/2017 Bathelet ............... G01N 33/386
(Continued)

FOREIGN PATENT DOCUMENTS

EP 1916514 A1 * 4/2008 ........... B07C 5/3408
FR 2 717 574 9/1995
(Continued)

OTHER PUBLICATIONS

Anthon du Plessis, "CT News: The Stellenbosch CT scanner facility newsletter", vol. 2, No. 1, Jan. 1, 2014.

*Primary Examiner* — Jennifer L Norton
(74) *Attorney, Agent, or Firm* — Millen, White, Zelano & Branigan, P.C.; Christopher W. Brody

(57) ABSTRACT

A method for controlling a process for forming glass containers (2) includes the steps of extracting a so-called sample container, acquiring by means of a tomography apparatus (30) several X-ray images of the sample container from different projection angles, sending the X-ray images to a computer (38), and analyzing the X-ray images using a computer. A three-dimensional digital model of the sample container is constructed in a virtual reference frame on the basis of the X-ray images. The position of the three-dimensional digital model with respect to the position of the sample container in a mold reference frame is determined and the three-dimensional digital model is analyzed to determine at least one quality indicator (A) of the sample container.

30 Claims, 8 Drawing Sheets

(51) Int. Cl.

| | |
|---|---|
| ***C03B 9/41*** | (2006.01) |
| ***G01N 23/046*** | (2018.01) |
| ***G05B 19/4063*** | (2006.01) |

(52) U.S. Cl.

CPC ........ *G01N 23/046* (2013.01); *G05B 19/4063* (2013.01); *G05B 2219/2635* (2013.01); *G05B 2219/45009* (2013.01)

(56) References Cited

U.S. PATENT DOCUMENTS

| | | | | |
|---|---|---|---|---|
| 10,890,477 | B2 * | 1/2021 | Cosneau | G01B 15/00 |
| 11,493,334 | B2 * | 11/2022 | Cosneau | G01B 15/02 |
| 11,549,803 | B2 * | 1/2023 | Cosneau | G06T 7/0002 |
| 2004/0194506 | A1 * | 10/2004 | Ueda | C03B 7/005 65/29.14 |
| 2004/0263620 | A1 * | 12/2004 | Diehr | G01N 21/8806 348/86 |
| 2010/0303287 | A1 | 12/2010 | Morton | |
| 2011/0141264 | A1 * | 6/2011 | Holtkamp | G01J 5/0003 348/E7.086 |
| 2011/0141265 | A1 * | 6/2011 | Holtkamp | G01J 5/025 348/86 |
| 2012/0174628 | A1 * | 7/2012 | Simon | G05B 19/41875 65/162 |
| 2014/0174127 | A1 * | 6/2014 | Dalstra | B07C 5/3408 65/29.11 |
| 2014/0211980 | A1 | 7/2014 | Bouchard et al. | |
| 2015/0142163 | A1 * | 5/2015 | Simon | G01N 21/90 700/158 |
| 2015/0227804 | A1 * | 8/2015 | Kobayashi | G06V 20/62 382/142 |
| 2016/0012305 | A1 * | 1/2016 | Cocquelin | G01B 11/26 382/199 |
| 2019/0145904 | A1 * | 5/2019 | Lopez | G01N 21/90 356/239.4 |
| 2021/0081507 | A1 * | 3/2021 | Kohlhoff | G06Q 50/04 |
| 2021/0268550 | A1 * | 9/2021 | Macouzet Díaz Leal | B07C 5/3408 |
| 2022/0196567 | A1 * | 6/2022 | Colle | G01N 23/083 |
| 2022/0244039 | A1 * | 8/2022 | Leconte | G01N 33/386 |
| 2023/0053561 | A1 * | 2/2023 | Diehm | G05B 19/4184 |
| 2024/0385123 | A1 * | 11/2024 | Colle | G01M 5/0091 |
| 2025/0180489 | A1 * | 6/2025 | Colle | B07C 5/3408 |
| 2025/0187967 | A1 * | 6/2025 | Saleh | G06T 7/0004 |
| 2026/0078042 | A1 * | 3/2026 | Bryant | C03B 5/245 |

FOREIGN PATENT DOCUMENTS

| | | |
|---|---|---|
| GB | 1 432 120 | 4/1976 |
| GB | 2 094 530 | 9/1982 |
| WO | 2013/185816 | 12/2013 |

* cited by examiner

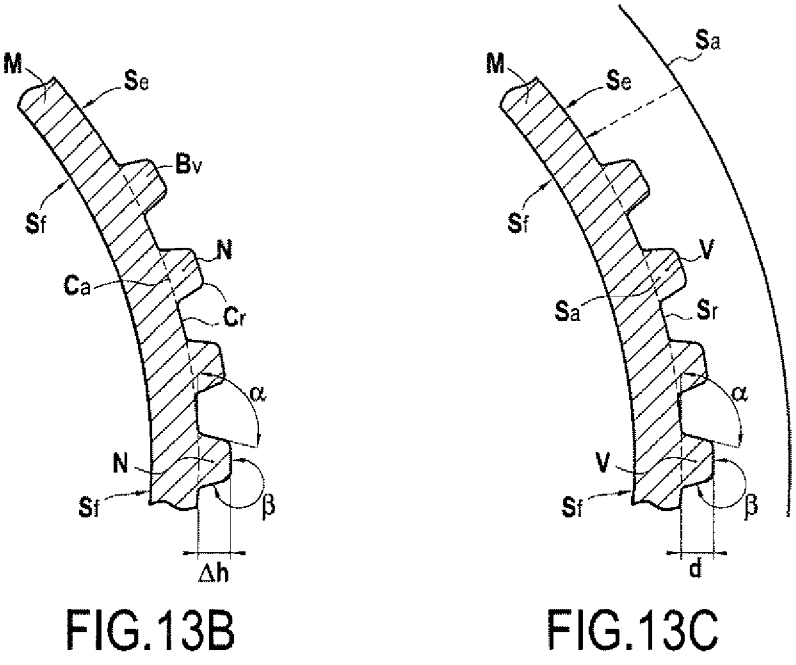
FIG.13B
FIG.13C
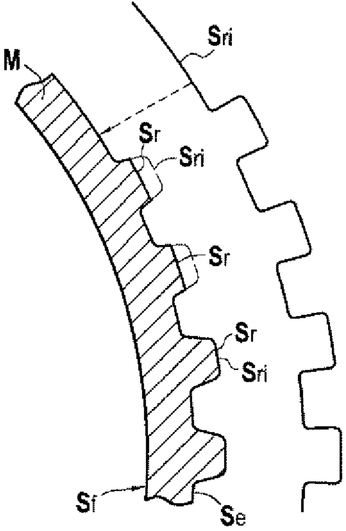
FIG.13D

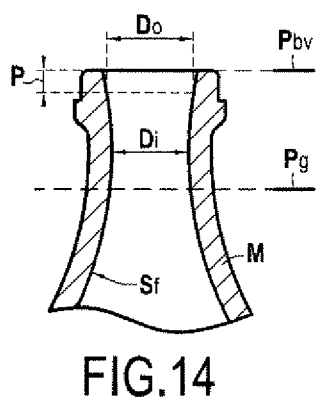
FIG.14
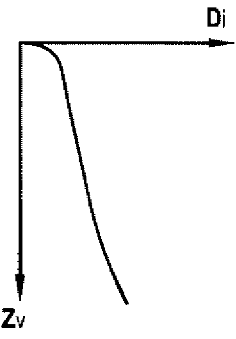
FIG.14A
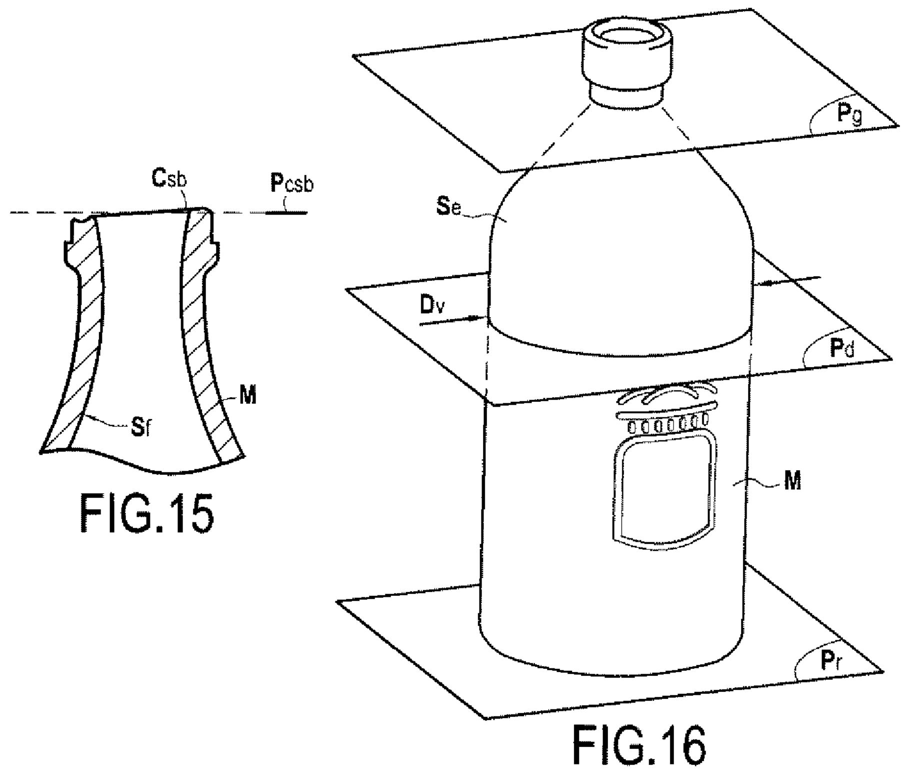
FIG.15
FIG.16

METHOD AND MACHINE FOR CONTROLLING A FORMING METHOD

FIELD OF THE INVENTION

The present invention concerns the technical field of the manufacturing of glass containers such as for example bottles, jars or vials, implementing a forming facility including several separate forming sections.

BACKGROUND ART

In a known manner, a forming facility includes several forming sections each comprising at least one preform mold and at least one finishing mold. This facility also includes a distributor of gobs of molten glass or drops of malleable glass falling under gravity in each preform mold. A gob of molten glass is first formed into a blank in the preform mold, then transferred for a final forming in the finishing mold. Each container extracted from the finishing mold at a temperature still in the order of 600° C. is conveyed to different processing and inspecting stations.

Controlling the quality of glass containers is necessary in order to eliminate those exhibiting defects liable to affect their aesthetic nature or, more seriously, to pose a real hazard for the subsequent user.

A first quality criterion of glass containers concerns the distribution of the glass i.e. the distribution of the thickness of the glass wall.

The distribution of glass in manufactured recipients depends on several control parameters of the forming process, such as the quality of the loading of the glass into the preform mold. Specifically, the centering of the glass drop with respect to the preform mold, the timing of the arrival of the drop, and its orientation/inclination upon its entry into the mold directly influence the distribution of glass of in the containers produced. Other features also influence this distribution, for example the lubrication and ventilation of the molds, the distribution of the temperature in the drop, and the deformations of the drop during distribution.

Moreover, the molds and particularly the finishing mold determine the shape of the containers, and more precisely its external surface. The forming of the glass drop determines the quantity of glass constituting the container. However, the internal surface of the container is produced by preblowing or blowing of the glass drop loaded into the preform mold, then the obtained blank is blown in the finishing mold. Also the internal surface depends on numerous control parameters of the method, and the thickness can vary according to these parameters at different places in the final container. For example, the vertical wall of the body can have thicker or thinner regions, a part of the bottom can be thicker, for example the inside of the bottom can be inclined or trapezoid instead of being flat. It is possible for the part of the shoulder corresponding to the right half-mold to be thicker than the opposite part. In another situation, the thickness of the lower body can increase at the expense of the upper body. It can also happen that thin areas below a given threshold appear at the level of the heel or the shoulder of the container.

An abnormal distribution of the glass is a manufacturing defect that must be corrected. It should be considered that it appears advantageous to identify a forming defect as soon as possible on exiting the forming facility in such a way as to correct it as soon as possible in this facility. In the prior art, various solutions have been proposed for controlling the glass distribution of the containers at high temperatures exiting the forming machine.

A simple but not very precise method is manual observation by the operators who select a container and observe the thickness of the wall at the level of the section. Where applicable a slide gage, a touch probe or a gage can give a measurement value. This destructive method, used sparingly, gives a measurement that is not very precise and limited to the location of the cut.

Manual glass thickness sensors exist. For example Hall effect manual sensors measure the distance between an internal ball and a sensor in contact with the external face. They are precise but manual only and a good deal of time is needed to obtain the glass distribution over the entire container. In addition, this measurement does not make it possible to guide the operators in the running of the forming process.

Another method is the observation of the hot containers as they travel past on the exit conveyor belt, by an infra-red camera starting from the principle that the thick regions of the containers radiate more. Consequently, the analysis of the infra-red images of the containers in different parts, probably indicates uneven glass distributions. However, since temperature distribution defects also cause uneven radiation, neither the operator nor the inspecting machine have real information about the glass distribution. In addition, some regions are hidden from the camera, even if two cameras are used.

Another quality criterion of glass containers concerns the nominal or total capacity of the containers.

The capacity of a container is the minimum volume of liquid it contains if it is filled to the brim or up to a determined height under the surface of the ring of the container. Regulatory or administrative provisions render it necessary to have precise knowledge of the capacity of the containers, The real capacity of the containers must correspond to the capacity indicated on the container which is for example etched on the container or inscribed on a label attached to the container.

Certain deviations in the method for manufacturing the containers can lead to variations in their capacity. For a constant volume of glass, if the volume of the finishing mold increases by wear, the internal volume of the container increases. For a constant mold volume, if the volume of glass increases, the capacity of the container decreases. In the same way, variations in shape (height, ovalization of the body etc.) can have an effect on the capacity of the containers. To measure the volume characteristics of the molds, the patent FR 2 717 574 teaches a method and a device for gauging the internal volume of a glassmaking mold.

To measure the capacity of the containers, there is known for example a machine marketed by the company AGR international, Inc. (http://www.agrintl.com/products/view/10/Fill-Height-Tester), based on the principle of weighing. This machine includes a weighing platform on which the empty container bears while resting on its bottom, in static equilibrium under gravity on a horizontal resting plane. This container is then filled with a liquid of known volume weight up to a nominal level considered with respect to the bearing plane delimited by the weighing platform. The filling of the container to the nominal level is performed by filling the container to above the nominal level and by removing the excess volume with a pipette bearing on the surface of the container ring such that the orifice of the pipette is at the nominal level with respect to the bearing plane. By weighing at a known temperature, this machine takes the measurement of the quantity of liquid actually contained inside the container and corresponding to the effective capacity of the container.

A drawback of this machine concerns the time for taking this measurement. In addition, this machine has the drawback of not being able to take other dimensional measurements unless it is the empty weight of the container. This machine thus complements automatic dimensional inspection apparatuses, of the optical or mechanical touch probe type, which do not make it possible to measure the capacity of the containers.

From the document US 2014/211980 there is also known a method and an apparatus using X-rays to measure the volume of a liquid partially filling a bottle by detecting, in particular, the surface of the liquid inside the bottle. Although this method makes it possible to measure the volume of a liquid inside a bottle, this technique does not make it possible to measure the actual capacity of a bottle on the one hand, and according to standardized conditions of measurement on the other hand.

The patent application US 2010/303287 describes an X-ray apparatus suitable for determining whether or not an object obtains a liquid. If such a document makes it possible to measure the volume of liquid contained inside a bottle, the technique described by this document has the same drawbacks as the patent application US 2014/211980. Within the same meaning, the patent application WO 2013/185816 describes a method and a system using X-rays to detect defects in containers or in their contents. This method does not make it possible to measure the actual capacity of a bottle according to standardized measurement conditions. Furthermore, these techniques do not make it possible to guide the operators in the running of the forming process implemented by the forming facility.

Another quality criterion of glass containers relates to the rendering of reliefs fashioned on the containers either for aesthetic purposes such as motifs or decorative etchings either for technical purposes (text, code, or otherwise containing an inscription, mold number, batch number, brand, or model) or for mechanical purposes such as the bead or cap thread, positioning tab or notch, bottom contact stripes, or label panel.

The rendering of reliefs is the fact that the relief relative to an average or background smooth surface is sufficient:

either for human reading (aesthetic aspect or reading of important information);

or for automatic reading (in the case of mold numbers on the insweep encoded in the form of dots or beads);

or for a mechanical use such as a shimming notch for orienting the container.

The rendering of the reliefs depends on several parameters:

the wear of the mold, i.e. therefore the drop in the positive or negative level of a cavity of the mold;

the fouling of a cavity of the mold, by dirt obstructing the mold cavity preventing the glass from entering the cavity;

the thermal aspects of the glass, which if too cold at the location of the cavity, is too viscous to penetrate the cavity;

the obstruction of the vents serving to allow the escape of the air caught between the cavity and the glass, or else the insufficient vacuum when the vents require a vacuum connection.

The estimate of the rendering of the reliefs, which is always very partial, is often visual and subjective. At the most, the rare measurements are made manually or by optical microscope, or with touch probes by quality departments. These measurements come too late to be useful in the running of the forming process. Most of the time, there is no standardized measurement principle for the rendering of relief.

Another quality criterion of glass containers concerns the internal geometry of the neck. Specifically, particularly according to the blow-and-blow process, the internal surface of the neck is not formed by a mold but by pressurized air.

The technical stresses on the neck are large due to the future use of the containers. Thus, the possibility of introducing a filling cannula will be guaranteed if a minimum diameter is respected along the height of the neck. The neck must actually be able to contain a solid straight cylinder of sufficient diameter. This check is called "broaching".

The diameter at the level of the ring surface or just below is known as the "diameter at the opening". One currently measures the internal diameter of a cylinder over a given depth under the ring surface, for example 5 mm, the diameter of which must be within a tolerance interval over said depth. This is necessary when the container is provided to be closed by a plug forming the seal by its contact on the internal surface of the top of the neck.

When the container is intended to be closed by an elastic plug, for example made of cork, then over the entire height of the plug in place, for example over 50 mm, the diameters must have a given profile known as the "internal profile" or "uncorking profile" which is a function linking the internal diameter with the depth.

The prior art has proposed various technical solutions for performing such inspections. For example, the patent GB 1 432 120 describes a device for inspecting containers including several inspection stations, one of which has the aim of checking the dimensional compliance of the neck rings and collars of the containers. This inspection station includes a mobile equipment driven by a motorization system in an alternating movement with respect to the jig of the device, in a direction of displacement parallel to the axis of symmetry of the containers. This mobile equipment is equipped with an external caliper for checking the outside of the neck ring of the containers and an internal caliper for inspecting the inside of the neck ring and of the collar of the containers.

A drawback of such a known device is the risk of a violent impact between the inspection head and the container, which runs the risk of damaging the container or the caliper. Another drawback of this type of inspection is that does not measure the diameters, but only checks the entrance of a cylinder. It therefore does not allow for the measurement of the internal profile.

For current devices for measuring the internal profile on sample containers, it is necessary to introduce into the neck articulated touch probes, two in number in opposing positions, or less commonly three at 120°. The two touch probes constitute articulated arms of a gripper. The lower ends of the gripper are put into contact with the internal surface by a spring. Their separation gives the internal diameter. The gripper and the container are then made to turn with respect to one another to have several diameters over 360°, and one can start again to measure at other depths. The drawback of these touch probes is their slowness, their fragility, their wear, and their lack of precision, since in particular it is never guaranteed that they are measuring diameters and not cords of arcs. In addition, any contact with hot containers is to be avoided.

There are many other quality criteria for glass containers such as those relating to the functional dimensions of the ring of the containers, planarity of the surface of the ring of the containers, the verticality of the containers, total or taken at the collar or the body of the containers, etc.

The external diameters and the ovalization of the wall, the height of the container, the verticality of the body, of the collar or of the container overall, the planarity of the rings, the internal diameters of the necks are measured using "multi-inspection" devices. It should be noted that these container-measuring apparatuses basically use either mechanical touch probes or optical detection. Contrary to what those skilled in the art may think, the fact that the containers are made of transparent glass does not make it possible to measure the internal surface by optical methods. This is why the measurements of the internal diameters of the necks are performed with mechanical touch probe devices even when the other measurements are optical.

A study of the prior art leads to the observation that quality control of glass containers requires the implementation of multiple inspecting or measuring devices. In addition, these inspecting or measuring devices do not make it possible to obtain precise, repetitive and fast measurements. Finally, these inspecting or measuring devices are not capable of giving complete enough information to determine the corrections to be made to the control parameters of the facility for forming glass containers.

SUMMARY OF THE INVENTION

The present invention has the aim of remedying the drawbacks of the prior art by proposing a method for controlling the quality of glass containers, designed for taking precise, repetitive and fast measurements using a single machine, and suitable for giving more complete information on the corrections to be made to the control parameters of a process for forming glass containers of a forming facility.

Another subject of the invention is to propose a new method making it possible to control, as an aspect of the quality of the glass containers, both the distribution of the glass of these containers, and the capacity of these containers or the rendering of reliefs exhibited by such glass containers.

Another subject of the invention is to propose a new method giving the possibility of always inspecting many other quality criteria of glass containers using a single machine.

Another subject of the invention is to propose a method for controlling the quality of the containers, suitable for being implemented at any moment in the process for forming the containers but advantageously sooner after their forming, the containers moreover still being at high temperature.

To achieve such objectives, the aim of the method is to control a process for forming glass containers implementing a facility with several separate forming sections in each of which at least one gob of molten glass is firstly formed into a blank in at least one preform mold, then secondly given its final form in at least one finishing mold.

According to the invention, the method includes the following steps:

- extracting a so-called sample container coming from an identified preform mold and an identified finishing mold;
- resting the sample container on a sample holder of a computer-assisted X-ray tomography apparatus;
- acquiring by means of the tomography apparatus several X-ray images of the sample container from different projection angles;
- sending the X-ray images to a computer;
- supplying to the computer the position of the sample container in the finishing mold, in a mold reference frame;
- analyzing X-ray images using the computer to:
  - construct in a virtual reference frame a three-dimensional digital model of the sample container on the basis of the X-ray images;
  - determine the position of the three-dimensional digital model with respect to the position of the sample container in the mold reference frame;
- and analyzing the three-dimensional digital model to determine at least one quality indicator of the sample container in relation to at least one region of the sample container, making it possible to deduce from it an item of adjustment information for at least one control parameter of the forming process in relation to the mold of the sample container.
- In addition, the method according to the invention can further include in combination at least one and/or the other of the following additional features:
- for determining the position of the three-dimensional digital model with respect to the position of the sample container in the mold reference frame, a method implemented by an operator consists in marking an referencing relief on the sample container and resting the sample container on the sample holder in such a way that its referencing relief is positioned with respect to a visual or mechanical referencing device of the sample holder;
- for determining the position of the three-dimensional digital model with respect to the position of the sample container in the mold reference frame, another method consists in:
  - choosing an referencing relief on the sample container, the position of which is known in the mold reference frame;
  - locating on the three-dimensional digital model the virtual referencing relief corresponding to the chosen referencing relief;
  - and determining the position of the virtual referencing relief in the virtual reference frame to deduce from it the position of the three-dimensional digital model in the mold reference frame;
- according to an advantageous variant for constructing the three-dimensional digital model, the method consists in taking into account the sample holder in such a way as to have a virtual vertical axis extending perpendicularly with respect to the virtual resting plane of the sample container on the sample holder and in providing a relative rotation about the virtual vertical axis, of the three-dimensional digital model in order to bring the virtual referencing relief into a position corresponding to the position of the referencing relief in the mold reference frame;
- it is advantageous to identify the preform mold and/or the finishing mold from which the extracted sample container has come by a mold or location number and to make this mold number or location number available in relation to the quality indicator of the sample container;
- for identifying the preform mold and/or the finishing mold from which the sample container has come, bearing a relief which indicates the mold or location number in the form of a code or alphanumerically, the method consists in:
  - providing the reading of the relief borne by the sample container and communicating the number read to the computer;

or analyzing the three-dimensional digital model of the sample container, by searching for the location of a virtual relief corresponding to the relief of the sample container, and reading this virtual relief to make it available to the computer;

according to a preferred application, the sample container is extracted at the latest before entry into the annealing lehr of the facility;

advantageously, the method consists in determining a quality indicator of the sample container, making it possible to deduce an item of adjustment information for at least one control parameter of the process for forming containers for the identified molds, from among:

the weight or the shape of the glass gob loaded into the identified preform mold;

the position or the speed of the glass gob upon its loading into the identified preform mold;

a synchronization or speed or force in the movement of the mechanisms of the blowing plungers, of the identified molds, of the transfers of the blanks, of the extracting grippers;

the cooling of the identified molds or of an associated plunger;

a blowing or pressing pressure for the identified molds;

the replacement of an identified mold;

according to an exemplary application, the method consists in determining as a quality indicator of the sample container, the distribution of the glass of the sample container;

according to another exemplary application, the method consists in determining as a quality indicator of the sample container, at least a volume measurement of the sample container taken from among the capacity of the sample container, the volume of the envelope of the sample container and the glass volume of the sample container;

according to another exemplary application, the method consists in determining as a quality indicator of the sample container the rendering of the reliefs fashioned on the sample container;

according to another exemplary application, the method consists in determining as a quality indicator of the sample container the internal geometry of the neck of the sample container;

according to another exemplary application, the method consists in determining as a quality indicator of the sample container the planarity of the ring surface of the sample container;

according to another exemplary application, the method consists in determining as a quality indicator of the sample container a number of external diameters of the body of the sample container;

for determining the glass distribution as a quality indicator of the sample container, the method consists in determining the position of the center of mass of the three-dimensional digital model or of a portion of said model, and by comparing this position with a reference position;

for determining the glass distribution as a quality indicator of the sample container, the method consists in determining the thickness of the glass wall over at least one region of the sample container, searching in this region for the position of an area with a thickness greater than a predefined value and/or a thickness less than a predefined value, where applicable by determining the extent of said area, and/or searching for the presence and the position of the place in the wall exhibiting the minimum or the maximum thickness in said region;

for determining the glass distribution as a quality indicator of the sample container the method consists in:

determining the volume of glass contained in at least two regions of the three-dimensional digital model divided either by a plane of vertical section containing the virtual vertical axis of the three-dimensional digital model or by a plane of horizontal section perpendicular to said virtual vertical axis;

and in comparing said volumes with values of reference volume and/or between several regions of one and the same sample container, and/or between several sample containers;

for determining the rendering of reliefs fashioned on the sample container as a quality indicator of the sample container, the method consists in:

positioning at least one section plane on the three-dimensional digital model of the sample container in such a way that it selects at least a part of a virtual relief of the external surface of said model;

determining in the section plane, the representative curve of the section of the virtual relief;

overlaying at least partly on the representative curve a zero-altitude curve representing the curve of the external surface of the sample container devoid of said virtual relief;

comparing the representative curve with the zero-altitude curve, by computing as relief rendering criterion at least one of the following quantities:

a distance between the representative curve and the zero-altitude curve;

a separation in slope at a given position between the representative curve and the zero-altitude curve;

a variation in the slope of the representative curve;

an area delimited by the representative curve and the zero-altitude curve;

for determining the rendering of reliefs fashioned on the sample container as a quality indicator of the sample container, a variant consists in:

determining the representative surface of the relief as a portion of the external surface of the three-dimensional digital model in the area of interest containing at least a part of a virtual relief;

overlaying at least partly on the external surface of the area of interest, a zero-altitude surface representing the surface of the area of interest devoid of said virtual relief;

comparing the representative surface with the zero-altitude surface, by computing as relief rendering criterion at least one of the following quantities:

a distance between the zero-altitude surface and the representative surface;

the separation in slope at a given position between the zero-altitude surface and the representative surface;

a variation in the slopes of the representative surface;

volumes delimited by the zero-altitude surface and the representative surface;

for determining the rendering of reliefs fashioned on the sample container as a quality indicator of the sample container, another variant consists in:

determining the representative surface of a virtual relief as a portion of the external surface of the three-dimensional digital model in the area of interest containing at least a part of the virtual relief corresponding to the relief of the sample container;

overlaying at least partly on the external surface of the area of interest, a theoretical relief surface representing the surface of the area of interest if the virtual relief is correctly rendered;

comparing the representative surface with the theoretical surface, by computing as relief rendering criterion, at least one of the following quantities:

a distance between the representative surface and the theoretical surface;

a separation in slope at a given position between the surfaces;

a number of volumes delimited by the surfaces;

for determining the rendering of reliefs fashioned on the sample container as a quality indicator of the sample container another variant consists in:

selecting on the three-dimensional digital model a virtual relief corresponding to a relief with a technical purpose, the position of which is known;

positioning a section plane in such a way that it cuts said relief in a section plane corresponding to a design plane;

obtaining a representative curve of the section of the virtual relief;

measuring on this representative curve a radius of curvature and/or an angle, a length, or a distance to a zero-altitude curve;

comparing the measurement with predefined tolerance values.

for determining the capacity of the sample container as a quality indicator of the sample container, the method consists in:

determining the internal surface of the three-dimensional digital model of the sample container;

determining a filling level plane on the three-dimensional digital model of the sample container, the filling level being either the surface plane of the virtual ring or a nominal filling level plane;

and measuring by computation the internal volume of the three-dimensional digital model of the sample container delimited by the internal surface and the filling level plane, this measurement being the capacity of the sample container;

for determining the volume of the envelope of the sample container as a quality indicator of the sample container, the method consists in:

determining the external surface of the three-dimensional digital model of the sample container;

determining a volume enclosing plane as being the ring surface plane or the lower plane of the ring mold seam;

and measuring by computation the internal volume delimited by the external surface and the enclosing plane as being the volume of the envelope of the sample container;

for determining the volume of glass of the sample container as a quality indicator of the sample container, the method consists in determining the volume of the wall of the three-dimensional digital model of the sample container;

an advantageous variant consists in analyzing the three-dimensional digital model by searching for bubbles corresponding to lacks of material between the internal surface and the external surface, and in measuring the volumes of said bubbles, which are then subtracted from the volume of the wall of the three-dimensional digital model, determined between the internal surface and the external surface, with a view to obtaining a volume corresponding to the volume of glass of the gob loaded into the identified preform mold, the blank of which has been transferred into the finishing mold from which the sample container has come;

according to an advantageous application, the method consists in:

considering as being a measurement of the volume of the gob loaded into the preform mold, the volume of glass of the three-dimensional digital model, either taking the material lacks into account or not taking them into account;

considering the internal volume delimited by the external surface of the three-dimensional digital model and an enclosing plane as being a measurement of the internal volume of the finishing mold;

considering the volume delimited by the internal surface of the three-dimensional digital model and a filling level plane as being a measurement of the capacity of the sample container;

deducing measurements of the capacity of the sample container and of the internal volume of the finishing mold, the volume of the gob to be loaded into the preform mold from which the sample container has come;

and deciding when the capacity of the sample container is not compliant, to modify the weight of the gob for at least the preform mold from which the sample container has come or to replace the finishing mold;

for determining the geometry of the neck of the sample container as a quality indicator of the sample container, the method consists in:

determining on the three-dimensional digital model the internal surface corresponding at least to that of neck;

positioning at least one section plane parallel to a virtual resting plane;

measuring in this plane several diameters of the internal surface and determining the minimum and/or the maximum in the section plane;

advantageously, the method has the aim of determining as an indicator of the geometry of the neck;

the diameter at the opening;

and/or the broaching diameter;

and/or the internal profile of the sample container;

for determining the planarity of the ring surface of the sample container as a quality indicator of the sample container, the method consists in:

determining on the basis of the three-dimensional digital model a closed three-dimensional curve or an annular surface representative of the ring surface;

positioning a reference plane of the ring surface in relation to the closed three-dimensional curve or to the annular surface;

and measuring the separations between the reference plane and the closed three-dimensional curve or the annular surface;

for determining the external diameters of the body of the sample container as a quality indicator of the sample container, the method consists in:

determining on the basis of the three-dimensional digital model the external surface corresponding to at least the part of the sample container for which an external diameter is to be measured;

positioning a section plane parallel to the virtual resting plane of the model along at least one height of the container;

measuring several diameters in this section plane with respect to the external surface and comparing these measurements to reference values.

Thus, the method according to the invention makes it possible to take, in addition to measurements previously impossible such as the distribution of the glass, or with separate apparatuses (inspection of capacity and gauging of the molds), all the measurements made by glassmaking metrology machinery via touch probes and/or optical sensors of the prior art.

The invention also relates to a machine for controlling a process for forming glass containers implementing a facility with several separate forming sections in each of which at least one gob of molten glass is firstly formed into a blank in at least one preform mold, then secondly given its final form in at least one finishing mold.

According to the invention, the machine includes:

- a computer-assisted X-ray tomography apparatus, able to take several X-ray images from different projection angles of a sample container placed on a sample holder of said apparatus;
- a device for knowing the position of the sample container in the finishing mold, according to a reference frame of the mold;
- a computer linked to the device and to the tomography apparatus and configured to analyzing the X-ray images for:
  - constructing in a virtual reference frame a three-dimensional digital model of the sample container on the basis of the X-ray images;
  - determining the position of the three-dimensional digital model with respect to the position of the sample container in the machine reference frame;
  - analyzing the three-dimensional digital model to determine at least one quality indicator of the sample container in relation to at least one region of the sample container, making it possible to deduce from it an item of adjustment information for at least one control parameter of the forming process in relation to the mold of the sample container;
- and a system for delivering at least the quality indicator of the sample container in relation to at least one region of the sample container.

In addition, the machine according to the invention can further include in combination at least one and/or the other of the following additional features:

- the system for delivering at least the quality indicator of the sample container in relation to at least one region of the sample container includes a display system for the quality indicator in relation to the identity of the finishing mold;
- the system for delivering at least the quality indicator of the sample container in relation to at least one region of the sample container includes a connection for sending to a control system of the forming facility, the quality indicator in relation to the identity of the finishing mold;
- a system supplying to the computer the mold or location number of the sample container.

The invention also relates to a facility for forming glass containers including several separate forming sections in each of which at least one gob of molten glass is firstly formed into a blank in at least one preform mold, then secondly given its final form in at least one finishing mold.

According to the invention, the facility includes a machine according to the invention arranged at the exit of the finishing molds.

Various other features are apparent from the description given below with reference to the appended drawings which show, by way of non-limiting example, forms of embodiment of the subject of the invention.

BRIEF DESCRIPTION OF THE DRAWINGS

FIGS. 13B to 13D are section views along the lines C-C of FIG. 13A and illustrating different methods of inspection of the rendering for a number of reliefs.

FIG. 14 is a section view of a three-dimensional digital model showing the neck of a container and illustrating the method for inspecting the internal geometry of the neck of a container.

FIG. 14A is a curve representing the values of the internal diameter Di of the neck along the vertical axis Zy of the virtual reference frame.

FIG. 15 is a section view of a three-dimensional digital model showing the neck of a container and illustrating the method for checking the planarity of the surface of the ring of a container.

FIG. 16 is a perspective view of a three-dimensional digital model of a container and illustrating the method for inspecting the external diameters of the body of a container.

DETAILED DESCRIPTION OF THE INVENTION

Figure 1:
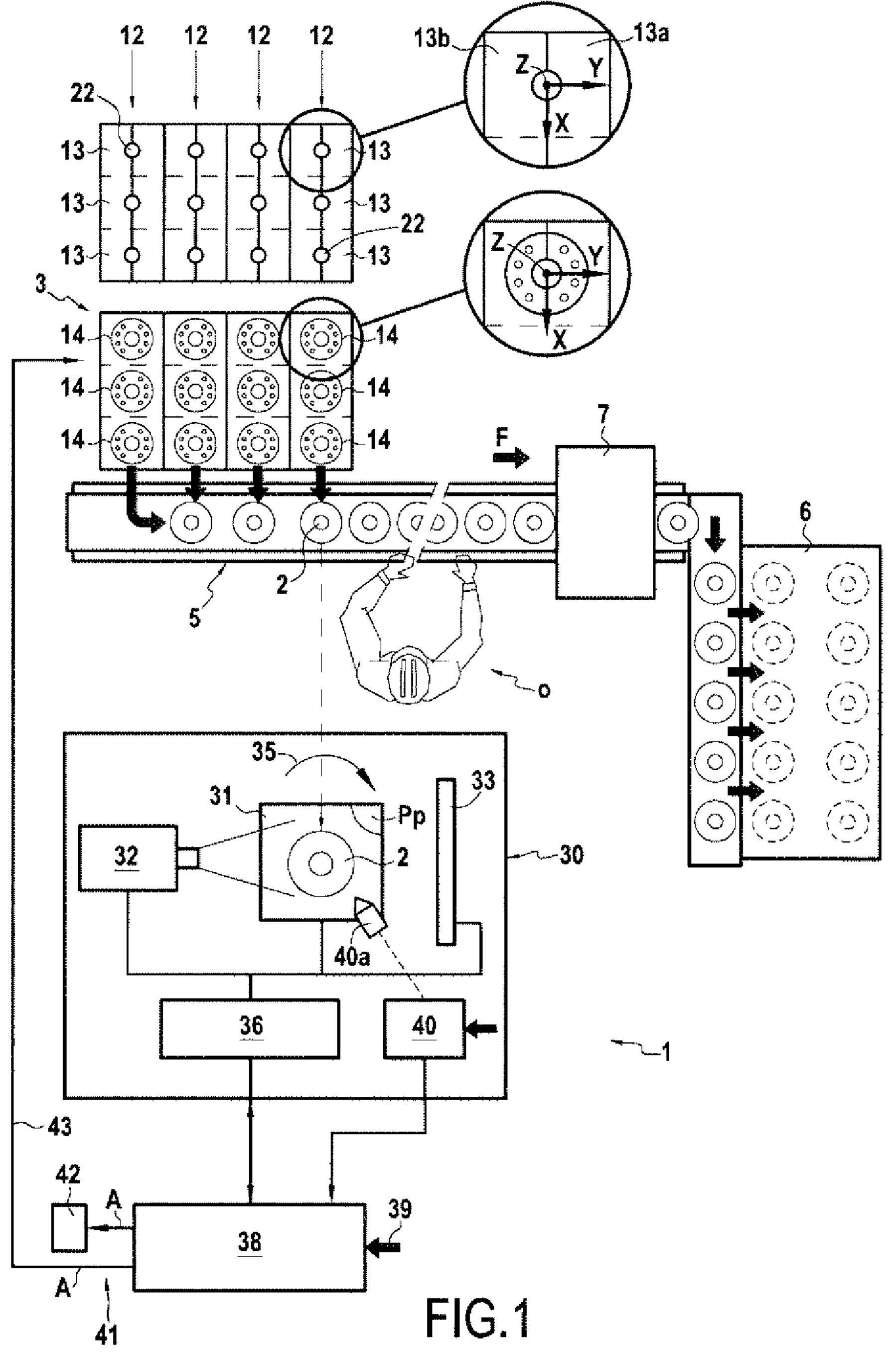
FIG. 1 is a schematic top view showing an inspecting machine according to the invention positioned by way of example at the exit of a facility for forming containers.

As appears more precisely from FIG. 1, the subject of the invention relates to a machine 1 making it possible to control a process for forming transparent or translucent glass containers 2 by a facility 3 for manufacturing or forming of all types known per se. At the exit of the forming facility 3, the containers 2 such as for example glass bottles or vials, have a high temperature typically between 300° C. and 600° C.

In a known manner, the containers 2 that have just been formed by the facility 3 are successively placed on an exit conveyor belt 5 to form a line of containers. The containers 2 are transported in a line by the conveyor belt 5 in a direction of transfer F in order to successively convey them to different processing stations and in particular an annealing lehr 6, upstream of which is placed a coating hood 7 generally constituting the first of the processing stations after forming.

Figure 2:
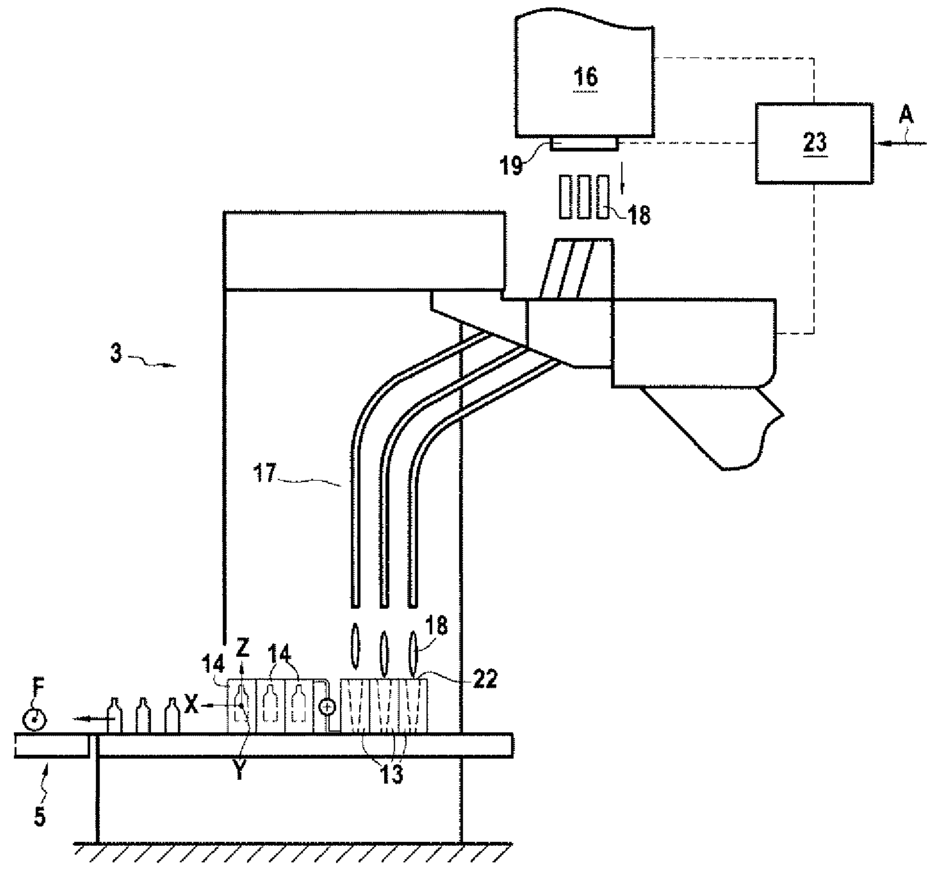
FIG. 2 schematically illustrates, in side view along a transverse axis X, a molding facility known per se.
Figure 3:
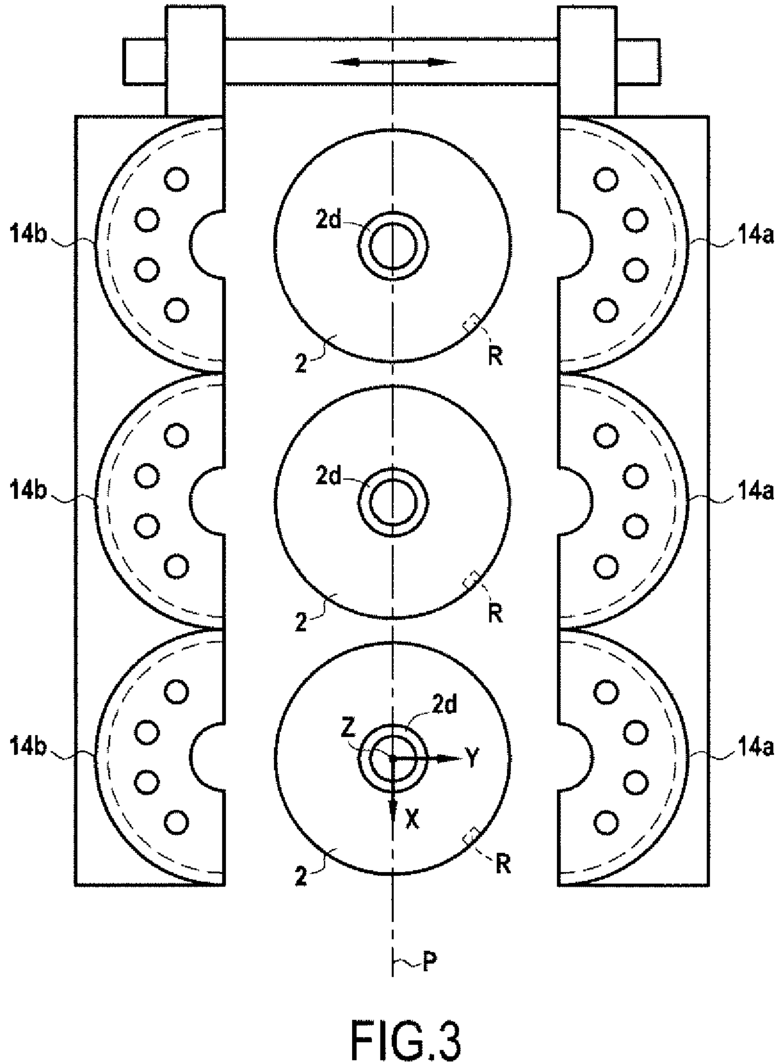
FIG. 3 is a schematic top view showing finishing molds in the process of being opened which have just formed glass containers.

FIGS. 1 to 3 illustrate an exemplary embodiment of a forming facility 3 known per se and which will be briefly described solely to allow understanding of the operation of the machine 1 according to the invention in relation to the forming facility 3.

The facility 3 includes several separate forming sections 12 each including at least one preform mold 13 and at least one finishing mold 14. The facility 3 includes a source 16 of malleable glass, and therefore of hot glass, and a distributor 17 of glass gobs which distributes, under gravity, gobs 18 of malleable glass to each preform mold 13. In a known manner, the source 16 of malleable glass is a tank fed with molten glass, at the bottom of which is found a vat including one to four circular openings. A rotary tube, the height of which is regulated, controls the flow rate of glass above the vat, and a system of one to four plunger(s), animated in a back-and-forth movement, extrudes the glass through the one to four openings of the vat in order to deliver the malleable glass under gravity in the form of one to four strings in parallel. The strings of malleable glass are finally separated into independent drops by a system of scissors 19 arranged at the exit of the hot glass source 16 and which is actuated at regular intervals for cutting into segments the malleable glass coming from the source 16.

For facilities including several (up to four) mold cavities per section, where applicable several segments are delivered in parallel simultaneously. In the present description, the term gob 18 refers to an extruded drop or segment of malleable glass as output by the scissor system 19. The malleable glass, at the point where it is cut by the scissor system 19, generally has a temperature greater than 900° C., for example between 1 100 and 1 300° C. This gob overall is a solid cylinder of malleable glass having a volume and a length defined by the adjustment of the source 16 cooperating with the cutting of the scissor system 19. Specifically, the diameter of the gobs is defined by that of the openings of the vat. The flow rate is controlled both by the height of the tube which acts on the overall flow rate and by the movements of the one to four plungers, which makes it possible to vary the flow rate separately for each opening of the vat. The time interval between two actuations of the scissor system 19 determines the length of the gob. To summarize, the length, the weight and the volume of each gob are determined by the parameters of the source 16 (the tube and the plungers) and the scissor system 19. The source 16 of malleable glass is arranged above the preform molds 13 to allow the distribution under gravity of the gobs, which are loaded through openings 22 fashioned in the upper faces of the preform molds 13.

The distributor 17 extends along several branches between the hot glass source 16 and the preform molds 13 of each of the forming sections. Generally, the hot glass source 16, by way of the scissor system 19, simultaneously delivers as many gobs as there are preform molds (or finishing molds respectively) in a forming section. It will therefore be understood that the forming sections are fed with gobs successively, one after another.

The distributor 17 therefore collects the gobs cut up by the scissor system 19 and conducts them to each of the preform molds 13 of each of the forming sections 12 along a corresponding loading trajectory. The loading trajectories for the different preform molds 13 include common portions and specific portions. A specific portion is a portion of the loading trajectory corresponding to a preform mold 13 which is taken only by the gobs which are directed by the distributor to this preform mold.

The distributor 17 therefore includes shunting means which is a type of chute or group of chutes pivoting, then guiding the gobs, including chutes and deflectors at the track end, above the preform molds. In particular the position of the deflectors with respect to the associated preform molds in part determines the position and orientation of the loading of each gob into said preform molds. In the distributor, the chutes, deflectors and shunts determine the loading trajectory of the gobs.

The facilities for forming glass containers implement different processes combining successive steps of filling, then pressing and/or blowing. For the sake of clarity of the description, the example is taken from the forming of containers according to known processes known as press-and-blow or blow-and-blow.

In facilities for forming containers, each forming section 12 can include several molds, for example two molds, one of which is a preform mold 13 and the other of which is a finishing mold 14. Each section 12 can include a set of preform molds and a set of associated finishing molds. It will be understood that in this case, a given gob is guided by the distributor 17 to a preform mold, for example a preform mold 13 of the forming section where the gob undergoes a first forming operation, known as the initial blowing, carried out by blowing compressed air or by penetration of a plunger. A transfer system (not represented) is then capable of extracting the gob having undergone the first forming operation, namely the blank, in the preform mold 13 to bring it into a finishing mold 14 where the blank can undergo at least a second forming operation, the last so-called finishing operation. Generally, each preform or finishing mold of a forming section includes two half-molds respectively 13*a*, 13*b* and 14*a*, 14*b* which are movable with respect to one another in a direction perpendicular to a mating plane P by which the two half-molds 13*a*, 13*b* et 14*a*, 14*b* are in contact in a closed position. In the illustrated example, the mating plane P extends along the vertical direction Z and the transverse direction X.

A section 12 can include a single finishing mold 14 receiving a blank from a single preform mold 13. However, as described above, each of the different forming sections 12 can include at least two separate finishing molds 14 and as many preform molds 13. The Figures illustrate the case of four forming sections 12 offset along a longitudinal direction perpendicular to the transverse direction X. According to this example, each forming section 12 includes three preform molds 13 respectively front, central and rear (or external, central and internal) each associated with a finishing mold 14 respectively front, central and rear i.e. each receiving the blank coming from a preform mold 13. In the illustrated example, the different preform molds 13 and respectively the finishing molds 14 of one and the same section are offset with respect to one another along a transverse direction X. In the illustrated example, the finishing molds 14 of one and the same section are of identical shape, therefore generally intended to form identical containers, but provision could be made for different shapes and weights.

It should be noted that each finishing mold 14 is identified in the forming facility with respect to the other finishing molds 14. In the same way, each preform mold 13 is identified in the forming facility. It is thus possible to identify the forming section 12, the preform mold 13 and the finishing mold 14 from which each container 2 has come.

In a facility for forming glass containers, each location of a preform mold 13 of each section bears according to different possible conventions, an identifier, for example a number or a letter. For example, the three locations for the second section of the facility represented in FIG. 1 can be identified by the letters a, b and c thus forming the locations 2*a*, 2*b*, 2*c* to respectively designate the front, central and rear mold of the section number 2. These identifications will be referred to in the rest of the description as "location numbers".

Moreover, the finishing molds of the bottom or the body can bear a cavity in order to print the number of the mold in relief on the containers 2, for example a number between 1 and 99 or between 1 and 128, etc. A table of correspondence between the location numbers and the mold numbers is permanently available for the operators or the IT system of the facility. In some facilities, a laser marker is used as written in the patent EP 2 114 840 B1 in order to print a code indicating the mold number or the location number on each container while still hot, immediately after its forming.

Thus, the containers generally bear, either in code (bar code, dot code, Datamatrix cod) or alphanumerically, the indication of the mold number or the location number. To re-read these mold or location numbers borne by the containers, various optical reading systems exist for manufacturing lines as described in EP 1 010 126 or EP 2 297 672 or EP 2 992 315.

Thus, in the present description, it will be understood that identifying the finishing mold from which a sample container has come is therefore equivalent to knowing either the location number or else the mold number. It will be understood that the identification of the finishing mold makes it possible to directly identify the associated preform mold supplying the blank.

It is also apparent from the preceding description that each preform mold 13 and each finishing mold 14 has a mold reference frame X, Y, Z making it possible to precisely locate each container in this mold reference frame (FIGS. 1 and 3). In other words, each container 2 manufactured can thus be located in this mold reference frame X, Y, Z of the preform mold 13 and the finishing mold 14 from which each container 2 has come. The vertical axis Z is the axis of symmetry of the container passing through the axis of its neck whereas the transverse axis X is contained in the mating plane of the mold such that the plane XZ is known as the mating plane P of the mold. The positive longitudinal axis Y is placed on the side of the right half-shell of the mold for an observer O located in front of the forming facility on the side of the finishing molds 14 and the exit conveyor belt 5.

In forming facilities, the control and synchronization of the operations for forming the gobs, scissor cutting, moving the molds, moving the plungers, blowing, transfers etc. are carried out by means of a control system 23 within the general meaning, making it possible to run the various mechanisms necessary for the operation of the facility for implementing the process for forming the containers.

In accordance with a feature of the control method according to the invention, a so-called sample container 2 which has come from a finishing mold 14 is extracted on exiting this finishing mold 14. The sample container 2 is extracted at all the places of the different processing stations after forming. According to an advantageous implementing feature, the sample container 2 is extracted at the latest before entry into the annealing lehr of the facility. In this case, the sample container 2 is at a high temperature typically between 300 and 600° C. It should be noted that the finishing mold 14 from which this sample container has come is identified as explained previously, i.e. the forming section 12 to which this finishing mold 14 belongs is known, as is identified the preform mold 13 which has formed the blank which was then loaded into this finishing mold.

This sample container 2 is intended to be inspected by the control machine 1 according to the invention and more precisely by a computer-assisted X-ray tomography apparatus 30 forming part of this machine. Typically, this computer-assisted X-ray tomography apparatus 30 includes a sample holder 31 on which the sample container is set 2.

As is more precisely apparent from FIG. 1, a computer-assisted X-ray tomography apparatus 30 conventionally includes, in a chamber sealed from X-rays, at least one source 32 for generating X-rays coming from its emission source and at least one linear or matrix sensor 33 sensitive to X-rays. The sample holder 31 of the apparatus 30 serves as a mechanical resting plane Pp for the sample container 2 and is suitable for positioning between the source 32 and the sensor 33 the sample container 2, which is thus irradiated by the X-rays By absorption and scattering, the material of the sample container 2 attenuates the X-rays crossing it as a function of the atomic mass and the thickness of material crossed. The sample container 2 being empty, only the material of the sample container attenuates the X-rays. The X-ray sensitive sensor 33 located opposite the tube with respect to the sample container 2, receives the attenuated X-rays, and delivers an image of the attenuation caused by the material of the container alone, i.e. an X-ray image I of the wall of the sample container 2.

The apparatus 30 also includes a system 35 for creating a relative movement between the sample container 2 and the source 32—sensor 33 pair. Conventionally, this system 35 causes a displacement of known value of the sample container 2 with respect to the source 32—sensor 33 pair, which remains fixed. Advantageously, this displacement system 35 provides the rotation of the sample container on itself about an axis of rotation which, preferably but not mandatorily, is colinear with the vertical axis of symmetry of the sample container.

The apparatus 30 also includes a control unit 36 for controlling the source 32, the sensor 33 and the displacement system 35 allowing the operation of the apparatus and the obtainment of the X-ray images. Thus, this control unit 36 provides a known relative displacement of the sample container 2 with respect to the source 32 and the sensor 33 in such a way as to perform projections of the sample container at variable angles. The control unit 36 provides the acquisition during this displacement of several X-ray images. Thus, the sample container 2 is displaced between each acquisition of an X-ray image, in such a way that each X-ray image is a projection of the sample container along mutually different directions. The acquired X-ray images of the empty sample container 2 are sent to a computer 38 for analysis and processing.

It should be noted that the sensor 33 can have a field height greater than the size of the sample container 2. The displacement system 35 is controlled to provide the rotation of the sample container 2 on itself typically over one turn and the unit 36 provides the acquisition of the different projections of the container over the 360° of rotation.

According to another variant embodiment, the sensor 12 can have a field height less than the size of the sample container 2. According to this example, the displacement system 35 is designed to also provide a relative displacement in vertical translation between the sample container 2 and the source 32 and/or the sensor 33 to analyze by scanning the entirety of the sample container 2.

For example, the displacement system 35 provides the rotation of the sample container 2 on itself and a vertical translation of the sample container 2 with respect to the source 32-sensor 33 pair which remains fixed. If the sensor 33 is a linear sensor of a horizontal field, the unit 36 drives the displacement system to position the sample container 2 in such a way that the upper end of the sample container is positioned in the field of the sensor 33. The unit 36 then drives the rotation of the sample container 2 over one turn and provides the acquisition of the projections of the sample container on the sensor during this turn. The displacement system 35 translationally displaces the sample container downward in an incremental pitch before the rotation of the sample container on itself and the acquisition of the projections of the sample container. The displacement and acquisition steps are repeated until the lower end of the sample container 2 is positioned in the field of the sensor 33.

Alternatively if the sensor 33 is a linear sensor of a horizontal field, the unit 36 can drive the displacement system to give the container a spiral movement continuously combining rotation about the axis and translation along said axis, which allows an acquisition of a multitude of X-ray images or projections of the sample container 2.

A known computer-assisted X-ray tomography apparatus 30 as described above is marketed by the company RX SOLUTIONS under the commercial name EasyTom.

Such a computer-assisted X-ray tomography apparatus 30 is linked to the computer 38 which possesses the X-ray images of the sample container 2 from different projection angles. The computer 38 is programmed to analyze the X-ray images to implement the checking method according to the invention.

It should be noted that the computer 38 is linked to a device 39 for knowing the position of the sample container 2 in the identified finishing mold 14, according to the mold reference frame X, Y, Z. In other words, the computer 38 receives the information concerning the position of the sample container 2 in the identified finishing mold 14, according to the mold reference frame X, Y, Z.

Figures 4, 4A, 5, 6, 7:
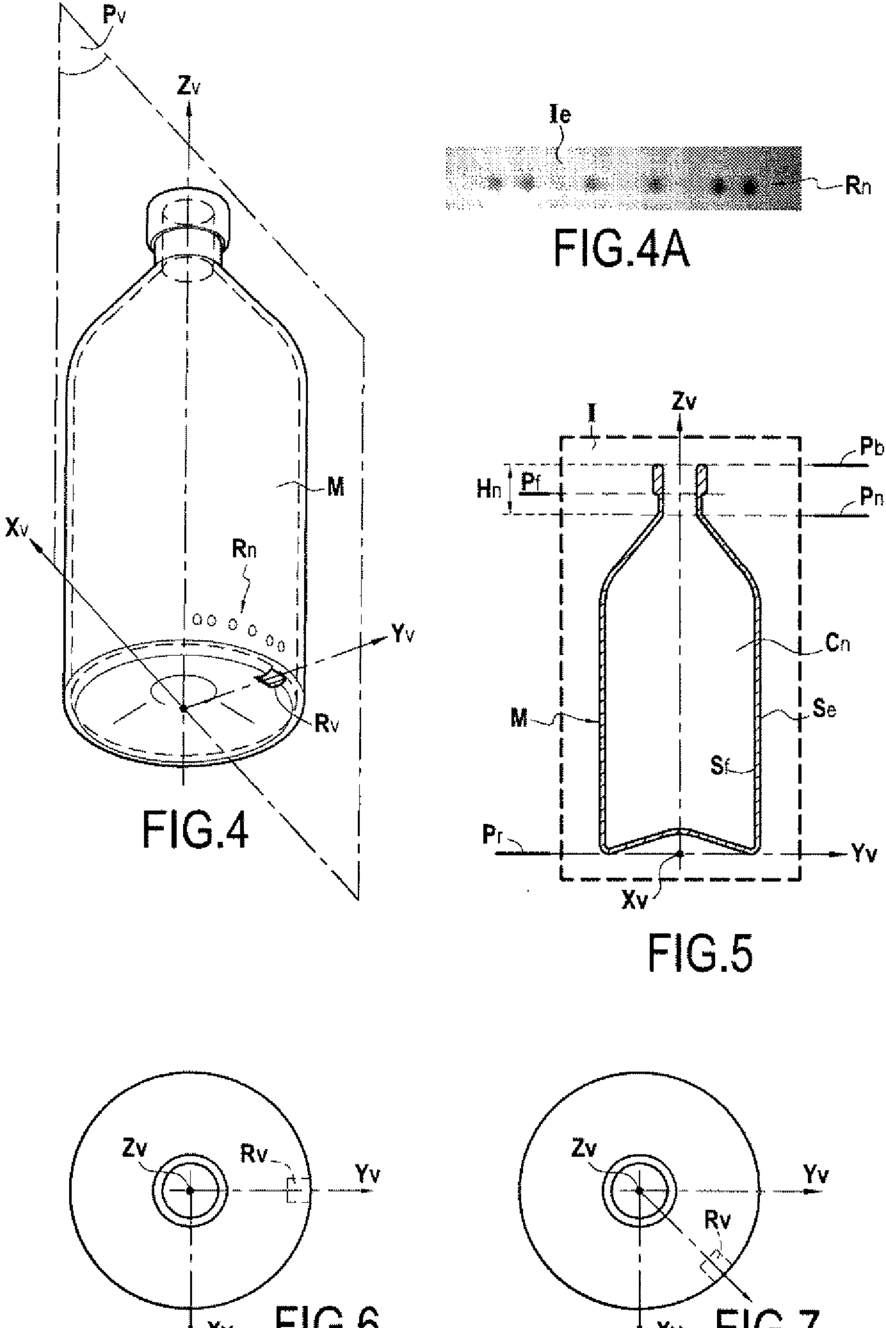
FIG. 4 is a schematic perspective view of an example of a three-dimensional digital model of a container obtained using a computer-assisted tomography apparatus.
FIG. 4A is a plane view showing an example of an image of a code resulting from a model of a container.
FIG. 5 is a schematic section-elevation view of an example of a three-dimensional digital model of a container.
FIGS. 6 and 7 are top views of the three-dimensional digital model in two characteristic positions with respect to a virtual reference frame.

The computer 38 is configured or programmed to analyze the X-ray images in order to construct in a virtual reference frame Xv, Yv, Zv, a three-dimensional digital model M of the sample container 2 on the basis of the X-ray images (FIGS. 4 and 5). As the X-ray images are taken when the sample container 2 is empty, the X-ray images I only make the material of the sample container appear contrasted in relation to the air, the attenuation of which is negligible compared with that of the glass forming the sample container. The three-dimensional digital model M also has an external surface Se corresponding to the external surface of the sample container 2 and an internal surface Sf corresponding to the internal surface of the sample container 2.

The construction of the three-dimensional digital model M is produced in any appropriate way known to those skilled in the art. Typically, the analysis of the X-ray images of the empty sample container 2 makes it possible to reconstruct a three-dimensional digital model of the sample container in the form of a set of "voxels", i.e. unit volumes, the value of which is the absorption of X-rays that they create, which thus results in a volumetric distribution function very similar to a density distribution.

The production of a three-dimensional digital model is the way—in mathematical, graphic and data structure terms—in which three-dimensional objects are represented and manipulated in a computer memory. This three-dimensional digital model is analyzed to measure dimensions (lengths, surfaces, thicknesses, volumes). The three-dimensional digital model can remain volumetric or be converted into a surface model, i.e. in which are modeled surfaces separating homogenous volumes.

In surface models, an object is defined by its envelope, its boundary-surfaces, which makes it possible to understand interior/exterior concepts, and the closed surfaces define volumes, to which can be assigned, for example, a weight as soon as a volumetric weight of the material is given. The surfaces are modelled in several ways such as by polygonal modeling, by curves or parametric surfaces (cylinders, cones, spheres, splines etc.) or by subdivision of surfaces. Using a polyhedron mesh, for example triangles, the surfaces of the objects are represented by sets of planar facets connected by their vertices.

A volumetric model consists in basing the representation on sets of identical unit volumes known as Voxels.

In order to effect length measurements several approaches exist.

In a first volumetric method, it is possible to travel through a volumetric model along a line or a bundle of lines and determine the material/air boundary voxels.

In a second surface method, it is possible to compute a segment, the ends of which are the intersections of a line with the surface of a surface model. The algorithms solve the topological problems fairly well. The point is single. Finally, a mixed method consists in converting the volumetric model into a surface model, then in applying the second method.

In the present description, it should be understood that the correspondence between an element of the three-dimensional digital model M and an element of the sample container 2 means that the element of the three-dimensional digital model M is the virtual representation of the element of the sample container 2.

The computer 38 is configured or programmed to determine the position of the three-dimensional digital model M with respect to the position of the sample container 2 in the mold reference frame X, Y, Z. In other words, the three-dimensional digital model M corresponding to the sample container 2 is analyzed in such a way as to be able to be referenced in a known position with respect to the position of the sample container 2 in the finishing mold. Thus, it is possible, for any region of the three-dimensional digital model M, to know the position in the finishing mold, of the region of the sample container 2 corresponding to this region of the three-dimensional digital model M.

Of course, different methods can be implemented for referencing the three-dimensional digital model M with respect to the position of the sample container in its identified finishing mold.

A first so-called manual solution can be envisioned consisting in considering an referencing relief R on the sample container 2. The term "referencing relief" is understood to mean, in particular, reliefs borne by containers such as the mold seam reliefs or reliefs fashioned on containers for aesthetic purposes such as motifs or decorative etchings or for technical purposes (text, code or other inscription of contents, mold number, batch number, brand, model) or for mechanical purposes such as the back-ring or a cap thread, a positioning tab or notch, the bottom contact stripes, or a label panel. In the example illustrated in FIG. 3, the referencing relief R on the sample container 2 corresponds to a positioning notch fashioned at the level of the bottom of the sample container.

The position of the referencing relief R is known in the mold reference frame X, Y, Z.

This sample container 2 is positioned on the sample holder 31 in such a way that its referencing relief R is positioned with respect to a visual or mechanical device for referencing the sample holder 31. Thus, as the computer-assisted X-ray tomography apparatus 30 knows the position of the visual or mechanical device for referencing the sample holder 31, the apparatus constructs the three-dimensional digital model M in a virtual reference frame Xv, Yv, Zv, known with respect to the mold reference frame X, Y, Z. In other words, with respect to the actual position of the sample container on the sample holder, the three-dimensional digital model M of this sample container is created making it possible, in particular, to locate the right part or the left part of this model respectively corresponding to the right and left parts of the sample container, separated by the mold mating plane.

To provide the referencing of the three-dimensional digital model M, another so-called software solution may be envisioned consisting in choosing an referencing relief R on the sample container 2, the position of which is known in the reference frame X, Y, Z of the finishing mold from which said sample container 2 has come. The method then consists in locating on the three-dimensional digital model M the relief corresponding to the referencing relief R chosen on the sample container 2, and denoted as the virtual referencing relief Re (FIG. 4). It is thus possible to determine the position of the virtual referencing relief Re in the virtual reference frame Xv, Yv, Zv, to deduce from it the position of the three-dimensional digital model M in the mold reference frame X, Y, Z of the identified finishing mold. Thus, for any region of the three-dimensional digital model M, it is possible to know the position in the finishing mold of the region of the sample container 2 corresponding to this region of the three-dimensional digital model M. The plane defines by the axes Xv, Zv of the virtual reference frame Xv, Yv, Zv, is the virtual mating plane Pv corresponding to the mold mating plane P.

According to an advantageous variant embodiment, this referencing method consists in constructing the three-dimensional digital model M taking into account the sample holder 31 which serves as mechanical resting plane Pp for the sample container 2. This method consists in positioning the three-dimensional digital model M of the container resting on its bottom, on a reference plane Pr of the virtual reference frame considered as corresponding to the mechanical resting plane Pp, this reference plane being also denoted by a virtual resting plane in the rest of the description. Pr.

According to an advantageous feature of the embodiment, the method consists in positioning the three-dimensional digital model M of the sample container on the reference plane or virtual resting plane Pr in such a way that the three-dimensional digital model M of the sample container is found stood in static equilibrium on three points of its bottom in contact with the reference plane or virtual resting plane Pr. This technique takes into account the value of a density for the material of which the container is composed.

For this positioning, the choice may be made to simulate gravity so that the three-dimensional digital model M of the sample container is found stood in static equilibrium on three points of its bottom in contact with the reference plane or the virtual resting plane Pr.

According to another advantageous variant embodiment, when the method has the aim of determining the capacity of the container, the method consists in positioning the three-dimensional digital model M of the sample container on the reference plane or virtual resting plane Pr in such a way that by simulation of gravity, the three-dimensional digital model of the container filled virtually up to a filling level plane with a liquid of given density, finds itself stood in static equilibrium on three points of its bottom in contact with the reference plane or virtual resting plane Pr. This simulation method makes it possible to approach as closely as possible the reality of a sample container filled with a liquid and resting on a resting plane.

It is thus possible, as can be seen from FIG. 5, to have a virtual vertical axis Zv extending perpendicularly with respect to the virtual resting plane Pr of the sample container on the sample holder. As illustrated in FIGS. 6 and 7, the method then consists in providing a relative rotation about the virtual vertical axis Zv of the three-dimensional digital model M in order to bring the virtual referencing relief Rv into a position corresponding to the position of the referencing relief R in the mold reference frame of the finishing mold.

In the analysis of the three-dimensional digital model M, it is advantageous as previously explained to determine the resting plane of the sample container and to use this plane as the base Xv, Yv of the virtual reference frame.

Other methods of referencing are advantageous. For example it may be required to define the apex of the three-dimensional digital model M. This will be the furthest point from the resting plane. It is also possible to determine a ring surface plane Pb as:

- a plane passing through three points of the ring surface;
- or a median plane of the ring surface;
- or a plane positioned in static equilibrium on the ring surface.

The aim of the method according to the invention is then to analyze the three-dimensional digital model M to determine at least one quality indicator A of the sample container 2 in relation to at least one region of the sample container. In other words, the computer 38 is programmed to analyze the three-dimensional digital model M in such a way as to determine at least one quality indicator A of the sample container 2 in relation to at least one region of the sample container coming from a finishing mold. In accordance with the invention, the analysis leads to the obtainment of at least one quality indicator A of the sample container 2 making it possible to deduce from it an item of adjustment information for at least one control parameter of the forming process in relation to the identified mold of the sample container 2. In other words, this quality indicator A gives an item of information about the corrections to be made to the control parameters of the forming process of the forming facility 3.

These control parameters concern the control parameters of the forming process in particular in relation to the identified mold of the sample container 2. It is recalled that the preform mold 13 and/or the finishing mold 14 from which the extracted sample container has come are identified by a mold number or a location number.

According to a preferred application, the method according to the invention has the aim of identifying the preform mold 13 and/or the finishing mold 14 from which the sample container 2 has come by a mold number or by a location number and of making available this mold number or location number in relation to the quality indicator A of the sample container. The identification of the mold and the making available of the mold or location number can be performed in different ways.

In a totally manual use, the operator extracts a sample container 2 knowing its mold or location number. Once the computer 38 has delivered the value or values of the quality indicator or indicators, the operator can act on the method as a function of the mold or location number of the sample container.

In the other modes of use, the machine 1 according to the invention includes a system 40 supplying to the computer 38 the mold or location number of the sample container 2. This system 40 supplies the mold or location number according to the various following solutions.

a) During the manual loading of the sample container onto the sample holder 31, the system 40 is an inputting interface allowing the operator to enter the mold or location number of the sample container.

b) In the case of automatic loading of a series of sample containers, an order is previously established with the rest of the mold or location numbers of the successive sample containers being known. This rest of the mold or location numbers of the sample containers is supplied by the system 40 to the computer 38. Alternatively the member for extracting and loading the sample containers or a supervising IT system, supplies by the system 40 the mold or location numbers of each successive sample container.

c) Provision can be made for equipping the machine 1 with a system 40 including an automatic reader 40*a*, optical for example, of a relief borne by the sample container and indicating the mold number, this system communicating to the computer 38 the numbers read and where applicable the table of correspondence with the location numbers.

d) Provision can also be made for the system 40 for supplying the mold or location number to be performed by analyzing means implemented by the computer 38 for analyzing the three-dimensional digital model M of the sample container 2. This analysis has the aim of searching on the three-dimensional digital model M for the location of a virtual relief Rn indicating the mold or location number, and corresponding to the mold or location number borne by the sample container 2. In the example illustrated in FIG. 4, the three-dimensional digital model M of the sample container 2 includes as virtual relief Rn indicating the mold or location number a series of prints spatially distributed to form a code.

After locating this virtual relief Rn, the analyzing means provide the reading of this virtual relief Rn. According to a first method, the computer isolates said virtual relief from the background by subtracting a background surface matched by a best-fit algorithm. As illustrated in FIG. 4A, it is possible to obtain a two-dimensional image Ie, in which the code appears contrasted in black on white or white on black. To read this virtual relief according to a second method, the computer projects the thicknesses of the wall of the area containing the virtual relief Rn to obtain an image of projected thickness. In this image of thickness Ie, which is a two-dimensional image in which the level of gray represents the thickness of glass projected, the code appears contrasted in black on white or white on black. On the basis of the two-dimensional images obtained, the code can then be analyzed, then read by an image processing algorithm moreover known, comprising for example the steps of segmentation and decoding or OCR (Optical Character Recognition). The code corresponding to this virtual relief is made available to the computer 38.

The machine 1 according to the invention delivers the quality indicator or indicators A of the sample container 2 in all possible exploitable forms. In this regard, the machine 1 according to the invention includes a system 41 for delivering at least the quality indicator A of the sample container in relation to at least one region of the sample container. For example, the system 41 for delivering at least one quality indicator A of the sample container in relation to at least one region of the sample container includes a display system 42 for the quality indicator in relation to at least one region of the sample container, this display being accompanied by the identity or the identification of the finishing mold and/or the preform mold identified. On the basis of this quality indicator A, an operator can then take the suitable corrective measures in relation to the identified finishing mold and/or the identified preform mold.

According to another exemplary embodiment combined or not combined with the example described above, the system 41 for delivering at least one quality indicator of the sample container in relation to at least one region of the sample container includes a connection 43 for sending to the control system 23 of the forming facility 3 the quality indicator A in relation to the identity of the finishing mold. This control system 23 can take suitable corrective measures, automatically or after validation. It is thus possible to imagine putting in place a table of correspondence between the quality indicators A and the effects on the control parameters of the forming process of the forming facility 3.

Without limitation, the quality indicator A of the sample container makes it possible to deduce an item of adjustment information for at least one control parameter of the process for forming containers for the identified molds, from among:

- the weight or the shape of the glass gob loaded into the identified preform mold;
- the position or the speed of the glass gob upon its loading into the identified preform mold;
- a synchronization or speed or force in the movement of the mechanisms of the blowing plungers, of the identified molds, of the transfers of the blank, of the extracting grippers;
- the cooling of the identified molds or of an associated plunger;
- a blowing or pressing pressure for the identified molds;
- the replacement of an identified mold.

According to an advantageous feature of the invention, the method consists in determining as a quality indicator A of the sample container at least one quality indicator taken from among the following list, namely:

- the distribution of the glass of the sample container;
- the measurement of at least one volume of the sample container taken from among the capacity of the sample container, the volume of the envelope of the sample container, the volume of glass of the sample container and the volume of glass of the gob loaded into the identified preform mold from which the blank has been transferred into the finishing mold from which the sample container 2 has come;
- the rendering of reliefs fashioned on the sample container;
- the internal geometry of the neck of the sample container;
- the planarity of the surface of the ring of the sample container;
- the external diameters of the body of the sample container.

The following description has the aim of describing the determination of the glass distribution as a quality indicator A of the sample container. Of course, the glass distribution of the sample container 2 can be highlighted according to various parameters or features determined on the basis of the analysis of the three-dimensional digital model M.

Thus, the position of the center of mass is a feature of the distribution of glass of the sample container 2.

The method according to the invention has the aim of determining the position of the center of mass Gv of the three-dimensional digital model M or of a portion of said model, and comparing this position with a reference position Gr of the center of mass.

For a container of revolution (for example of overall conical or cylindrical body and unetched), we have a center of mass theoretically centered horizontally on the axis of symmetry of the container. A method for verifying this property is to compute the projection parallel to the vertical axis, on a section plane, of all the material of the container. The center of mass of this projection must be centered on the intersection of the vertical axis and of the section plane.

If the container is not a simple revolution (generally asymmetrical shape, presence of etchings), it is possible to store in the memory a position of the center of mass of reference, learnt for example by analyzing the three-dimensional digital model of a reference container, the glass distribution of which is correct.

Figures 8, 9, 10, 11:
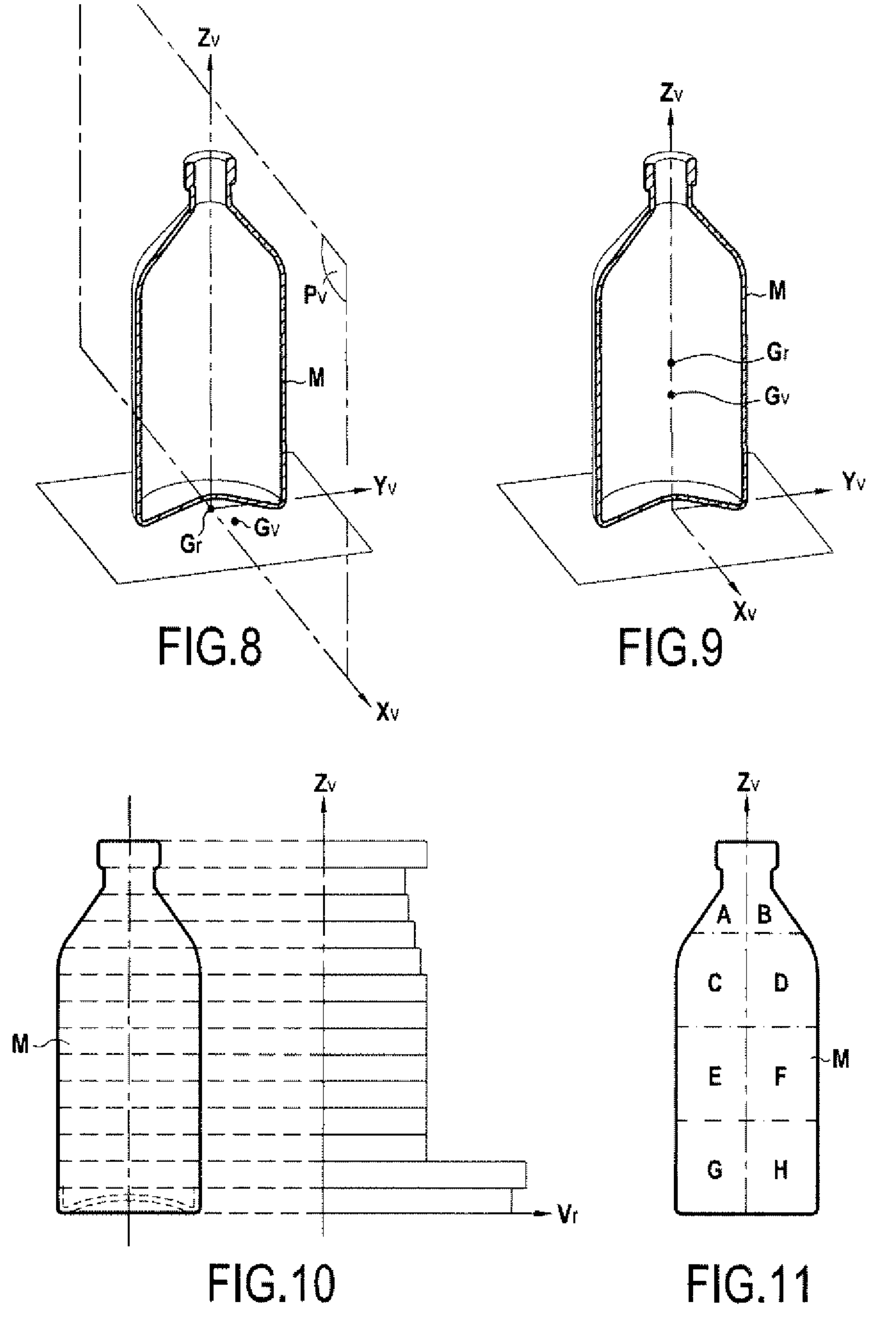
FIGS. 8 and 9 are section-elevation views of the three-dimensional digital model showing the position of the center of mass with respect to a center of mass.
FIG. 10 is a schematic section-elevation view passing through the virtual vertical axis Zv of the three-dimensional digital model giving the distribution of the volumes of glass Vr along the virtual vertical axis Zv.
FIG. 11 is a schematic plane view passing through the virtual vertical axis Zv of the three-dimensional digital model giving the distribution of the volumes of glass distributed into eight areas A to H.

FIG. 8 illustrates an exemplary embodiment in which the center of mass Gv of the three-dimensional digital model M in its entirety is projected into a plane Xv, Yv of the virtual reference frame Xv, Yv, Zv. The position of the center of mass of reference Gr of a reference container, the glass distribution of which is correct, is computed and projected in the plane Xv, Yv of the virtual reference frame Xv, Yv, Zv. If the centers of mass Gv and Gr are colinear, then it can be concluded therefrom that the glass distribution of the sample container 2 is correct. In the illustrated example, the center of mass Gv of the three-dimensional digital model M is offset between the positive directions X and Y i.e. toward the front of the right half-shell.

FIG. 9 illustrates an exemplary embodiment wherein the position of the center of mass of reference Gr of a reference container, the glass distribution of which is correct, is computed and placed along the vertical axis Zv of the virtual reference frame Xv, Yv, Zv (for a container of revolution for example). The center of mass Gv of the three-dimensional digital model M in its entirety is computed and where applicable projected onto the vertical axis Zv, of the virtual reference frame Xv, Yv, Zv. If the centers of mass Gv and Gr are colinear, then it can be concluded therefrom that the glass distribution of the sample container 2 is correct. In the illustrated example, the center of mass Gv of the three-dimensional digital model M is offset downward.

This item of information on the offset of the center of mass gives an item of information for adjusting the control parameters of the forming process such as for example the speed of the gob, the moment of arrival of the gob, the lubrication of the molds etc.

According to another example, the thickness of the glass wall is also a feature of the glass distribution of the sample container 2.

According to this example, the method according to the invention consists in determining the thickness of the glass wall over at least one region of the sample container, by searching for the position of an area with a thickness greater than a predefined value and/or a thickness less than a predefined value, and/or by searching in the different areas for the position and value of the minimal or maximal thicknesses. The method thus has the aim of analyzing the three-dimensional digital model M to measure the thickness between the external surface Se and the internal surface Sf over a region or the entirety of this three-dimensional digital model M. These measurements are compared with minimum and maximum threshold values making it possible to detect overly thin or overly thick areas and to measure the extent thereof. This method of course makes it possible to obtain a map of the thickness of the sample container 2.

It is also possible:

to determine the volume of glass contained in at least two regions of the three-dimensional digital model M divided either by a vertical section plane containing the virtual vertical axis Zv of the three-dimensional digital model M or by at least one horizontal section plane perpendicular to said virtual vertical axis Zv;

and to compare said volumes to reference volume values and/or between several regions of one and the same sample container, and/or between several sample containers.

FIG. 10 illustrates an example of an analysis of the three-dimensional digital model M used to represent the distribution according to the virtual vertical axis Zv of the volume Vr of glass taken in parallel slices perpendicular to the virtual vertical axis Zv. Of course, this distribution is compared to a distribution of volumes obtained on the basis of a three-dimensional digital model of a reference container.

FIG. 11 illustrates another example of an analysis of the three-dimensional digital model M making it possible to represent the distribution of volumes in a plane containing the virtual vertical axis Zv. According to this example, on either side of the virtual vertical axis Zv are represented the volumes of glass located in the four overlaid sections, namely A-B, C-D, E-F and G-H. Each of these areas can be compared with values of reference volumes or certain of these areas can be compared with one another. Thus, the volumes of the areas C-D can be compared with the volumes of the areas G-H to appraise the vertical distribution of the glass whereas an overall or pairwise comparison of the areas A, C, E and G with the areas B, D, F and H makes it possible to appraise the lateral distribution of the glass.

This information about the distribution of the thickness of the glass wall provides an item of information for adjusting the control parameters of the forming process such as, for example, the conditions of loading of the finishing mold (by acting for example on the position of the deflector), the ventilation of the preform mold, the greasing etc.

The following description has the aim of describing as a quality indicator A of the sample container at least one volume measurement of the sample container 2 taken from among the capacity of the sample container, the volume of the envelope of the sample container, the volume of glass of the sample container and the volume of glass of the gob loaded into the identified preform mold, which, it is recalled, is the preform mold from which the blank has been transferred into the identified finishing mold from which the sample container 2 has come.

Figure 12:
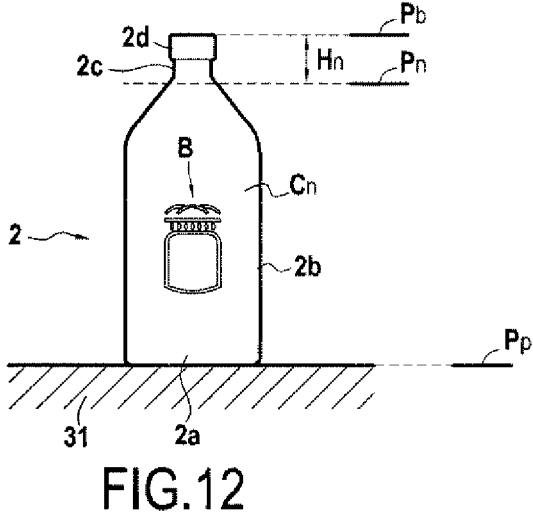
FIG. 12 is a schematic view of a container explaining the definition of the capacity of a container.

FIG. 12 makes it possible to illustrate the definition of the capacity of the glass containers 2. A container 2 is a hollow object conventionally including a bottom 2*a* from which rises a body 2*b* extending into a collar 2*c* ending in a ring 2*d* delimiting the opening or the mouth used to fill or empty the container. The capacity of the container 2 is the volume of liquid it contains by the internal surface of its wall when the container is resting on its bottom, in static equilibrium generally under gravity on a horizontal plane known as the mechanical resting plane Pp.

The brim-full capacity of the container 1 corresponds to the volume of liquid filling the container up to the so-called ring plane Pb passing through the ring 2*d* of the container, and more precisely at the level of the surface of the ring of the container. The nominal capacity Cn of the container 1 corresponds to the volume of liquid filling the container up to a liquid filling level plane Pn, extending parallel to the mechanical resting plane Pp and located at a determined height Hn from the ring plane Pb.

The determination of the capacity of the sample container 2 involves a step of analyzing the three-dimensional digital model M of the sample container 2 with the aim of:

- determining the internal surface Sf of the three-dimensional digital model M of the sample container 2;
- positioning a filling level plane Pn on the three-dimensional digital model M of the sample container 2 parallel to the resting plane and at a distance Hn from the apex of the digital model of the container;
- measuring by computation the internal volume of the three-dimensional digital model M delimited by the internal surface Sf and by the filling level plane Pn, knowing that this measurement corresponds to the filling capacity Cn of the container.

On the basis of the three-dimensional digital model M, the method consists in determining the internal surface Sf of the three-dimensional digital model as corresponding to the internal surface of the sample container 2.

The method then consists in positioning the filling level plane Pn in such a way as to close the internal surface of the three-dimensional digital model M of the sample container 2. Thus, a closed surface is defined surrounding or completely enveloping the filling volume of the container.

The method then consists in measuring by computation the internal volume delimited by this closed surface, namely by the internal surface Sf of the three-dimensional digital model M and the filling level plane Pn. Specifically, the internal volume delimited by this closed surface corresponds to the internal filling volume of the sample container up to the filling level.

According to an advantageous embodiment feature, the method consists in positioning the three-dimensional digital model M of the sample container resting on its bottom on a reference plane Pr of the virtual space assumed to be horizontal. As this reference plane simulates the resting of the sample container on a mechanical resting plane, this reference plane Pr is also denoted by a virtual resting plane.

As previously explained, the virtual resting plane can be the representation of the mechanical resting plane in the virtual space.

Next, the filling level plane Pn is positioned parallel to the reference plane or virtual resting plane Pr at a distance Hn from the apex of the three-dimensional digital model of the container.

According to an advantageous variant embodiment, the method consists in positioning the three-dimensional digital model M of the sample container on the reference plane or virtual resting plane Pr in such a way that by simulation of gravity, the three-dimensional digital model of the container is stood in static equilibrium on three points of its bottom in contact with the reference plane or virtual resting plane Pr. This technique takes into account the value of a density for the material of which the container is composed.

According to another advantageous variant embodiment, the method consists in positioning the three-dimensional digital model M of the sample container on the reference plane or virtual resting plane Pr in such a way that by simulation of gravity, the three-dimensional digital model of the container filled virtually up to the filling level plane by a liquid of determined density, is stood in static equilibrium on three points of its bottom in contact with the reference plane or virtual resting plane Pr. This simulation method makes it possible to approach more closely the reality of a container filled with a liquid and resting on a resting plane defining the filling level plane.

In the case where the filling level plane Pn is positioned at a distance Hn from the apex of the three-dimensional digital model M of the sample container, the apex of the three-dimensional digital model M of the container is determined as the point belonging to the three-dimensional digital model, the furthest from the reference plane or virtual resting plane Pr or as the point of intersection of a ring surface plane Pb of the three-dimensional digital model with an axis of symmetry of said model. In this latter case, the axis of symmetry is substantially orthogonal to the reference plane or virtual resting plane Pr and the ring surface plane Pb is defined as a plane passing through three points of the ring surface, or a median plane of the ring surface or a plane positioned in static equilibrium on the ring surface. Of course, the method according to the invention can be implemented for a sample container not including an axis of symmetry.

It results from the preceding description that to measure the brim-full capacity of the container, the method consists in positioning the filling level plane Pn at a zero distance Hn from the apex of the three-dimensional digital model.

In a variant of the method, to measure the brim-full capacity of the container, the method consists in considering that the filling level plane Pn is colinear with the ring surface plane Pb.

Within the same meaning, to measure the nominal capacity Cn of the container, the method consists in positioning the filling level plane Pn at a nominal distance Hn from the apex of the three-dimensional digital model.

Another measurement of volume of the sample container 2 is the volume of the envelope of the sample container. This measurement makes it possible to work backwards to the volume of the identified finishing mold from which the sample container 2 has come. For determining the volume of the envelope of the sample container, the method consists in:

- determining the external surface Se of the three-dimensional digital model M of the sample container 2;
- determining an enclosing volume plane as being the ring surface plane Pb or the lower neck ring mating plane;
- and measuring by computation the internal volume delimited by the external surface Se and the enclosing plane as being the volume of the envelope of the sample container.

According to an advantageous variant, the volume of the identified finishing mold from which the sample container 2 has come is determined by considering the shrinking of the sample container due to the cooling it has undergone between the moment of its molding and the moment of the acquisition of the X-ray images.

In another variant of this measurement, it is possible to determine what part of the identified finishing mold is involved by sharing the measured volume, by the virtual mold mating plane Pv in two half-shell volumes. In doing so, for greater precision, it can also be envisioned to remove the effect of the volume contained in the molds of the ring and the volume contained in the bottom mold. Specifically, the positions of all the mold seams and mating planes being determined in the mold reference frame X, Y, Z, they are known in the virtual reference frame Xv, Yv, Zv according to the invention. It is therefore possible to remove from the volume of the external surface, the volumes contained in the molds of the ring and of the bottom.

Another volume measurement of the sample container 2 is the volume of glass of the sample container. Specifically, the method consists in determining the volume of the wall of the three-dimensional digital model M of the sample container, corresponding to the volume of the glass wall of the sample container 2. The method has the aim of determining the surface which completely encompasses the wall of the three-dimensional digital model M, and which therefore comprises the internal surface Sf related to the level of the ring by the ring surface, at the external surface Se. This volume is a first usable measurement of the volume of glass of the sample container 2.

Another volume measurement of the sample container 2 is the actual volume of glass of the sample container. This measurement takes into account the material lack in the wall of the sample container, which takes the form of bubbles. For this purpose, the method analyzes the three-dimensional digital model M by searching for bubbles corresponding to material lacks between the internal surface Sf and the external surface Se. The method measures the volumes of said bubbles, which are then subtracted from the volume of the wall of the three-dimensional digital model M, determined between the internal surface Sf and the external surface Se. This volume measurement corresponds to the volume of glass of the gob loaded into the identified preform mold from which the blank has been transferred into the finishing mold from which the sample container 2 has come. The bubbles taken into consideration are bubbles of a dimension greater than a threshold. Specifically, the bubbles, which are extremely fine and uniformly distributed in the material are linked to the refining of the glass in the kiln. A very high resolution on the tomograph would be needed to see them, which increases the cost of the equipment (nanoscale focus and sensor resolution) and the operating cost by reason of the acquisition time that would be necessary with the equipment currently available. These refining bubbles being present in the gob are not to be taken into account for the computing of the gob volume on the basis of the volume of the container. On the other hand, bubbles of dimensions greater than a given threshold, which are visible with a tomograph with a simple micro-focus, are created in the delivery channels or during the loading or even during the blowing of the blank for the largest ones. It is therefore advisable to subtract their volume from the container in order to compute the gob volume on the basis of the actual volume of the container.

The presence, the dimensions and position of the loading or blowing bubbles constitute a quality criterion of the sample container in relation to the parameters of the method such as the forming of the gobs (temperature of the glass too cold near the plunger), the loading conditions of the gob into the blank, the ventilation of the preform mold and plunger (too hot) and the other blowing of the blank.

According to an advantageous feature of exploitation of the measurements of the volumes of the sample container, the method according to the invention consists in:

- considering the volume of glass of the three-dimensional digital model M as a measurement of the volume of the gob loaded into the preform mold, either taking the material lacks into account or not taking them into account;
- considering the internal volume delimited by the external surface M and an enclosing plane as being a measurement of the internal volume of the identified finishing mold;
- considering the volume delimited by the internal surface Sf of the three-dimensional digital model and a filling level plane Pn as being a measurement of the capacity of the sample container;
- deducing from the measurements of the capacity of the sample container and of the internal volume of the finishing mold, the volume of the gob to be loaded into the preform mold from which the sample container 2 has come;
- and deciding, when the capacity of the sample container is not compliant, to modify the weight of the gob for at least the preform mold from which the sample container has come or to replace the finishing mold.

Of course, one and/or the other of the measurements of the volumes of the sample container make it possible to deduce an item of adjustment information for various other control parameters of the forming process in relation to the mold of the sample container. The measurement of the capacity can lead to modifying, for example, the device for extracting the finishing mold. The measurement of the volume of the gob can be used to adjust the gob source and the scissor cutting. The measurements of the internal volume of the identified finishing mold can make it possible to identify an abnormal measurement related to greasing parameters (frequency, dosing).

The following description aims to describe as a quality indicator A of the sample container the rendering of reliefs B fashioned on the sample container 2.

The term relief B is understood in particular to mean reliefs borne by the external surfaces of the containers such as the mold seam reliefs or the reliefs fashioned on the containers either for aesthetic purposes such as motifs or decorative etchings or for technical purposes (text, code or other contents inscription, of mold number, batch number, brand, model) or for mechanical purposes such as the back-ring or cap thread, positioning tab or notch, bottom contact stripes, or label panel.

The method according to the invention has the aim of inspecting the relief or reliefs B the rendering or appearance of which one wishes to control, in particular by controlling their geometrical features. In the example illustrated in FIG. 12, the relief B on the sample container 2 corresponds to a motif fashioned at the shoulder on the external surface of the sample container. Of course, a choice can be made to partially or entirely inspect one or more of the reliefs present on the sample container 2.

Figure 13A:
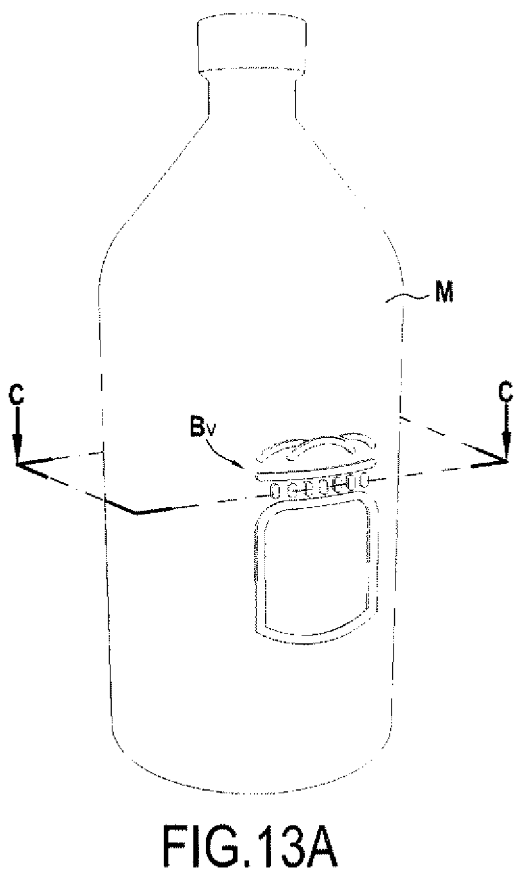
FIG. 13A is a view of a three-dimensional digital model of a container.

The method consists in referencing on the three-dimensional digital model M as illustrated in FIG. 13A the virtual relief By corresponding to the relief B of the sample container 2. Any location method can be implemented, bearing in mind that this location is simplified even further by the fact that, as explained previously, the position of the three-dimensional digital model M is known in the virtual reference frame, the relation of which with the mold reference frame is also known.

For determining the rendering of a relief B, several methods are possible by considering that the rendering of the virtual relief corresponds to the rendering of the relief borne by the sample container. According to the example illustrated more precisely in FIG. 13B, the method according to the invention consists in:

positioning at least one section plane C-C on the three-dimensional digital model M of the sample container in such a way that it sections at least a part of said virtual relief By;

determining in the section plane C-C the representative curve Cr of the section of the virtual relief;

overlaying at least partly on the representative curve Cr a zero-altitude curve Ca corresponding to the curve of the external surface Se of the sample container devoid of said relief;

and comparing the representative curve Cr to the zero-altitude curve Ca, by comparing a relief B rendering criterion which can appear in different quantities.

For example, as relief B rendering criterion, a distance can be taken between the zero-altitude curve Ca and the representative curve Cr. There can also be taken a separation in slope at a given position between the zero-altitude curve Ca and the representative curve Cr or a variation in the slope of the representative curve Cr. FIG. 13B illustrates in the form of an angle alpha the separation in slope at a given position between the zero-altitude curve Ca and the representative curve Cr and by an angle beta, a variation in the slope of the representative curve Cr. The area N delimited by the zero-altitude Ca and representative Cr curves can also be taken as the relief B rendering criterion.

It should be noted that this variant embodiment is advantageous in the case where the relief has a technical purpose and the position of it is of course known. This method consists in:

selecting on the three-dimensional digital model M a virtual relief corresponding to a relief with a technical purpose, the position of which is known;

positioning a section plane on the three-dimensional digital model M in such a way that it cuts said virtual relief in a section plane corresponding to a design or standardized definition plane bearing relief tolerance indication with a technical purpose;

obtaining a representative curve Cr of the section of the relief;

measuring on this representative curve a radius of curvature and/or an angle, a length, a distance to a zero-altitude curve Ca;

comparing these measures with the tolerance indication of the relief.

For determining the rendering of the reliefs, another method, illustrated in FIG. 13C, may be envisioned consisting in:

determining the representative surface Sr of the relief as an external surface portion of the three-dimensional digital model M in the area of interest containing at least a part of the virtual relief corresponding to the relief;

overlaying at least partly on the external surface Se of the area of interest of the virtual relief, a zero-altitude surface Sa representing the surface of the area of interest devoid of said relief;

and comparing the representative surface Sr with the zero-altitude surface Sa, by computing a relief B rendering criterion which can occur under different quantities such as those described above. Thus, as relief rendering criterion, at least one of the following quantities may be chosen:

- a distance d between the zero-altitude surface Sa and the representative surface Sr;
- the separation in slope a at a given position between the zero-altitude surface Sa and the representative surface Sr;
- a variation β in the slopes of the representative altitude surface Sr;
- a number of volumes V delimited by the zero-altitude surface Sa and the representative surface Sr.

For determining the rendering of the reliefs, another method as illustrated in FIG. 13D may be envisioned consisting in:

determining the representative surface Sr of the relief as an external surface portion Se of the three-dimensional digital model in the area of interest containing at least a part of the virtual relief corresponding to the relief;

overlaying at least partly on the external surface Se of the area of interest, a theoretical relief surface Sri representing the surface of the area of interest if the relief is rendered correctly;

comparing the representative surface Sr with the theoretical surface Sri, by calculating as relief rendering criterion at least one of the following quantities:

- a distance between the representative surface Sr and the theoretical surface Sri;
- a separation in slope at a given position between the representative surface Sr and the theoretical surface Sri;
- a number of volumes delimited by the representative surface Sr and the theoretical surface Sri.

One and/or the other of these quantities are compared, for example, with reference values for determining the rendering quality of these reliefs B to make it possible to deduce from it an item of adjustment information for at least one control parameter of the forming process in relation to the identified finishing mold of the sample container. Typically, it is possible to improve a rendering of a relief, to generally act on the final forming step in the finishing mold by modifying the ventilation of the mold, or the moment of blowing (the duration of the stretching), the blowing time, the maintenance of the finishing mold, and the vacuum in the vents.

The following description has the aim of describing as a quality indicator A of the sample container the internal geometry of the neck. As previously explained, this geometry is defined by the internal diameter values of the neck at different heights, or even over the whole height.

According to the invention, the method consists as illustrated in FIG. 14 in determining in the three-dimensional digital model M the internal surface Sf corresponding at least to the neck of the sample container. The method consists in choosing a section plane Pg for example parallel to the resting plane Pr of the model (FIG. 16), and cutting, at a given height, the neck of the three-dimensional digital model. It is then possible to measure several diameters from 0 to 360° in this section plane. The method consists in measuring in this plane several diameters of the internal surface and in determining at least the minimum and/or the maximum in the section plane.

It is also possible to determine the surface of the ring of the three-dimensional digital model in order to determine the plane of the ring surface Pbv of the model as explained previously. Thus, it is possible to determine the diameter at the opening Do (or mouth), for example at a distance p=5 mm under the mouth by positioning a section plane 5 mm under the ring surface.

It is also possible to determine the diameters over the entire height of the neck, by travelling across the ring surface (or ring surface plane Pbv) all the way to the bottom of the neck by a section plane parallel to the resting plane Pr or to the ring surface plane Pbv by measuring several diameters from 0 to 360° in each of these section planes. It is possible to determine for example the minimum diameter over 360° for each section plane, and to consider this diameter value as a function of the depth of the section plane in such a way as to obtain the internal or uncorking profile. FIG. 14A gives by way of example the internal profile measured, i.e. the change in the measurements of the internal minimum diameter Di along the vertical axis Zv over the whole height of the neck.

Alternatively, to measure the "diameter at the opening", which is specified by a minimum and maximum diameter tolerance, for example a tolerance interval of 18 mm+/−0.5, over a given depth starting from the ring surface, for example 5 mm, it is possible to virtually position a first cylindrical surface of a height of 5 mm, of a maximum diameter falling within the modelled internal surface of the neck, and in the same way a second cylindrical surface of a height of 5 mm, of a minimum diameter containing the modelled internal surface, and to consider as measurements of the diameter at the opening of the sample container, the diameters of the cylindrical surfaces falling within and outside it, which are respectively compared with the tolerances.

It is also possible to determine a minimum diameter over the whole height of the internal surface of the neck to check the broaching diameter.

The diameter at the opening, the broaching diameter, and the internal profile of the neck, are linked to parameters of the forming process such as the temperature of the gobs, those of the plungers and preform molds, the geometry of the ring molds at the preform mold, and the "timing" of compression and blowing.

The following description has the aim of describing as quality indicator A of the sample container the measurement of the planarity of the ring surface. The planarity measurement of the ring surface taken on the three-dimensional digital model M can be done in several ways.

As illustrated in FIG. 15, a method consists in determining an annular surface Csb representative of the surface of the ring. Said surface is in theory a planar ring or a perfect toroid, but other profiles exist. It is then possible to position a reference ring surface plane Pcsb and analyze the separations between the representative surface of the ring and said plane. One measures and analyzes the torsions of the surface transversely and/or tangentially. These torsions can be angles or curvatures of the surface. It is alternatively possible to determine and measure the deviations between said closed three-dimensional curve in a reference plane positioned in different ways as explained below. Methods have already been explained for measuring separations between surfaces. Thus the comparison of the representative surface with a plane consists in measuring the distances between surface points and/or volumes delimited by surfaces. In this case for example, if the ring surface is correct, the volume between this surface and the surface reference plane must be zero.

According to another variant, a three-dimensional curve representative of the ring surface is described. This curve is for example all the highest points with respect to the virtual resting plane Pr, detected over the whole periphery of the ring. This can also be points of joins between the internal surface Sf and the external surface Se of the model. It is possible to determine and measure the separations between said closed three-dimensional curve representative of the ring surface and a reference plane positioned in different ways as explained below. The measurement of the separations between the representative curve and the reference plane consists for example in measuring the distances between points of the curve and corresponding points of the reference plane between points of the curve and corresponding points of the reference plane of the ring surface. These distances are for example along the axis Zv.

The reference plane can be the ring surface plane as explained previously, i.e. either:

I. a plane passing through three points of the ring surface; it is possible to find an iterative algorithm simulating the resting of a plane in a static equilibrium position on the curve representing the ring surface;

II. or else a median plane of the ring surface, which is for example the plane passing in best fit according to a mathematical function through the point of the closed surface.

The criterion of planarity can also be defined by the curvature of the representative curve which normally is zero (infinite radius of curvature).

Another method consists in using cylindrical coordinates (r, Z, θ: radius r, height Z, angle θ) with the vertical axis z corresponding to the axis of the neck or of the ring. The planarity defects of the ring surface are often divided into at least two types. The "glass lack" types are related to problems of filling of the ring mold with the molten glass during the loading of the gob into the finishing mold. They are characterized by separations in height (Δz) extending over a small angular amplitude (Δθ) around the direction of the vertical axis. The defects of "clouded ring" type are separations in height generally less marked, which extend over a larger angular amplitude about the theoretical axis, but are nonetheless inconvenient defects, often due to sagging, to mechanical problems during the transfer of the extraction of the articles from the mold, or to thermal problems of glass temperature and cooling. Measuring the ring planarity is equivalent to determining separations between the ring surface and a plane.

It thus appears that the measurement of the planarity of the ring surface is a quality indicator that can be related to parameters of the forming process. For example, a defect of non-rendering type, corresponding either to an insufficient gob volume (or weight) to fill the preform mold, or an insufficient pressure of the plunger in press-and-blow, or an insufficient blow pressure, or poor compression.

The following description has the aim of describing as a quality indicator A of the sample container, external diameters of the body of the sample container.

According to the invention, the method consists as illustrated in FIG. 16, in determining in the three-dimensional digital model M, the external surface Se corresponding to at least the part of the sample container for which an external diameter is to be measured. The method consists in choosing at a given height a cutting plane Pd for example parallel to the virtual resting plane Pr of the model, and in measuring several diameters Dv of 0 to 360° in this cutting plane with respect to the external surface Se. Of course, provision can be made for positioning the cutting plane at different heights of the body of the sample container at the level of which the external diameter is to be measured. The method consists in comparing these measurements with reference values.

The measurement of the external diameters of the body of the sample container is a quality indicator which can be linked to parameters of the forming process such as the cooling of the molds, the maintenance of the molds, the times between opening of the mold and extraction etc.

It should be noted that the machine 1 according to the invention also makes it possible to determine various other quality indicators of the sample container. On the basis of the analysis of the three-dimensional digital model M, it is possible to measure:

- the verticality of the body, the neck or overall of the sample container;
- at as many heights as desired, external diameters of the body, their minimum and maximum and the ovalization of the sample container;
- the height of the sample containers;
- the inclination of the ring with respect to the bottom of the sample container;
- the orientation of the ring with respect to the body of the sample container;
- the quality of the mold seam (from burrs left at the mold joints);
- the abnormal curvature of the wall, hollow or outward (swollen) of the sample container;
- a sagging of the shoulder of the sample container.

It is apparent from the preceding description that the machine 1 according to the invention can have different configurations as a function of the need of the users to know the quality indicator or indicators of the sample container.

According to an advantageous configuration, the machine according to the invention is able to determine as a quality indicator of the sample container at least one quality indicator taken from the following list, namely:

- the distribution of the glass of the sample container;
- the measurement of at least one volume of the sample container taken from among the capacity of the sample container, the volume of the envelope of the sample container, the volume of glass of the sample container and where applicable the volume of glass of the gob loaded into the identified preform mold, the blank of which has been transferred into the finishing mold from which the sample container 2 has come;
- and the rendering of reliefs fashioned on the sample container.

According to another advantageous configuration, the machine according to the invention is able to determine as a quality indicator of the sample container, the measurement of the capacity of the sample container, the volume of the envelope of the sample container, the volume of glass of the sample container and where applicable, the volume of glass of the gob loaded into the identified preform mold, the blank of which has been transferred into the finishing mold from which the sample container 2 has come.

According to another advantageous configuration, the machine according to the invention is also able to determine as a quality indicator of the sample container, the distribution of the glass of the sample container, the measurement of the capacity of the sample container, the volume of the envelope of the sample container, the volume of glass of the sample container and where applicable, the volume of glass of the gob loaded into the identified preform mold, the blank of which has been transferred into the finishing mold from which the sample container 2 has come.

According to another advantageous configuration, the machine according to the invention is also able to determine as a quality indicator of the sample container, the rendering of reliefs fashioned on the sample container, the distribution of the glass of the sample container, the measurement of the capacity of the sample container, the volume of the envelope of the sample container, the volume of glass of the sample container and where applicable, the volume of glass of the gob loaded into the identified preform mold, the blank of which has been transferred into the finishing mold from which the sample container 2 has come.

According to another advantageous configuration, the machine according to the invention is able to determine as a quality indicator of the sample container the rendering of reliefs fashioned on the sample container, the distribution of the glass of the sample container, the measurement of the capacity of the sample container, the volume of the envelope of the sample container, the volume of glass of the sample container and where applicable, the volume of glass of the gob loaded into the identified preform mold, the blank of which has been transferred into the finishing mold from which the sample container 2 has come, and at least one other criterion taken from the following list:

- the internal geometry of the neck of the sample container;
- the planarity of the surface of the ring of the sample container;
- external diameters of the body of the sample container;

According to another advantageous configuration, the machine according to the invention is able to determine as a quality indicator of the sample container, the distribution of the glass of the sample container, the measurement of the capacity of the sample container and at least one other criterion taken from the following list:

- the internal geometry of the neck of the sample container;
- the planarity of the surface of the ring of the sample container;
- external diameters of the body of the sample container.

According to an advantageous embodiment feature, provision can be made for an operation of matching the three-dimensional digital model of the sample container with a reference three-dimensional digital model, representing a perfect container, then determining separations in dimension by measuring distance between surface elements belonging to the reference digital model and surface elements belonging to the three-dimensional digital model.

It should be noted that the machine 1 according to the invention can include various means of loading and unloading. These means can include a conveyor, a linear actuator with a gripper, a robot arm, a trolley equipped with pockets receiving series of sample containers to be measured etc.

The computer 38 can be connected to different members, such as a supervision system, a monitoring and statistical analysis system, or a control system of the forming facility.

The machine 1 is preferably installed near the manufacturing facility as represented in FIG. 1, and the sample containers are extracted at the latest before entry into the annealing lehr of the facility. They are generally still hot. If the sample containers are extracted after passing through the annealing lehr, then the reaction time for taking into account the indicators and modifying the parameters of the method is lengthened by a time in the order of 30 mins to 1 hour, which is not favorable to the successful exploitation of the quality indicators.

It is therefore envisionable but not favorable to install the machine 1 away from the manufacturing machine, for example in the cold sector, after the annealing lehr, or near a quality department.

The invention is not limited to the examples described and represented since various modifications can be made without departing from its scope.

The invention claimed is:

1. A method for controlling a process for forming glass containers (2) in a facility with several separate forming sections (12), the method comprising:

- extracting a sample container coming from an identified preform mold (13) and an identified finishing mold (14) of a forming section of the separate forming sections;

resting the sample container (2) on a sample holder (31) of a computer-assisted X-ray tomography apparatus (30);

acquiring by means of the computer-assisted X-ray tomography apparatus (30) several X-ray images of the sample container from different projection angles;

sending the X-ray images to a computer (38);

analyzing X-ray images using the computer to:

construct in a virtual reference frame a three-dimensional digital model (M) of the sample container from the X-ray images of the sample container; and analyze the three-dimensional digital model (M) to measure dimensions on the three-dimensional digital model and to determine from the measured dimensions at least one quality indicator (A) of the sample container in relation to at least one region of the sample container and an item of adjustment information for a control parameter of the process for forming glass containers in relation with the identified finishing mold of the sample container is deducible from the at least one quality indicator (A);

delivering the at least one quality indicator of the sample container;

making a correction to the control parameter of the process for forming glass containers, in relation with the identified preform mold and identified finishing mold, and based on the at least one quality indicator, among:

adjusting a weight or a shape of a subsequent glass gob loaded into the identified preform mold, adjusting a position, a speed, or a moment of arrival of the subsequent glass gob (18) upon loading of the glass gob into the identified preform mold, adjusting a synchronization or speed or force in movement of mechanisms of a blowing plunger, of the identified preform mold, of transfers of the blank, or of extracting grippers from the identified finishing mold, adjusting a cooling of the identified preform mold, identified finishing mold, or of an associated blowing plunger, adjusting a ventilation of the identified preform mold or identified finishing mold, adjusting a blowing or pressing pressure for the identified preform mold or identified finishing mold, adjusting a lubrication or greasing of the identified preform mold or identified finishing mold, adjusting a moment of blowing or a blowing time, and a vacuum in vents of the identified preform mold or the identified finishing mold, acting on a position of a deflector guiding the subsequent glass gob, replacing the identified preform mold or the identified finishing mold, and adjusting a temperature of the subsequent glass gob, of a blowing plunger and identified preform mold, a geometry of a ring mold at the identified preform mold, and a timing of compression and blowing;

wherein the at least one quality indicator (A) of the sample container is selected among a group of:

at least one volume measurement of the sample container taken from among a capacity (Cry) of the sample container, a volume of an envelope of the sample container and a glass volume of the sample container;

a rendering of reliefs (B) fashioned on the sample container;

an internal geometry of a neck of the sample container; and a planarity of a ring surface of the sample container, and forming a subsequent glass container from the identified preform mold and the identified finishing mold, using the control parameter adjusted to correct the process for forming glass containers; and obtaining the subsequent glass container having a distribution of the glass, a capacity or a rendering of reliefs corrected compared to the sample container.

2. The method as claimed in claim 1, wherein analyzing the three-dimensional digital model comprises determining a position of the three-dimensional digital model (M) with respect to a position of the sample container (2) in a mold reference frame, the method comprises referencing a referencing relief (R) on the sample container and resting the sample container on the sample holder (31) in such a way that the referencing relief (R) is positioned with respect to a visual or mechanical referencing device of the sample holder.

3. The method as claimed in claim 1, wherein analyzing the three-dimensional digital model comprises determining a position of the three-dimensional digital model (M) with respect to a position of the sample container in a mold reference frame, the method comprises:

choosing a referencing relief (R) on the sample container, where a position of the referencing relief (R) is known in the mold reference frame;

locating, on the three-dimensional digital model (M), a position of a virtual referencing relief (Rv) corresponding to a chosen referencing relief (R); and determining a position of the virtual referencing relief in a virtual reference frame to deduce from the position of the virtual referencing relief a position of the three-dimensional digital model (M) in the mold reference frame.

4. The method as claimed in claim 3, comprising constructing the three-dimensional digital model (M) taking into account the sample holder (31) in such a way as to have a virtual vertical axis extending perpendicularly with respect to a virtual resting plane (Pr) of the sample container on the sample holder; and providing a relative rotation of the three-dimensional digital model (M) about the virtual vertical axis in order to bring the virtual referencing relief (Rv) into a position corresponding to the position of the referencing relief in the mold reference frame.

5. The method as claimed in claim 1, further comprising identifying the preform mold (13) and/or the finishing mold (14) from which the sample container has come by a mold number or location number and in making the mold number or the location number available in relation to the at least one quality indicator (A) of the sample container.

6. The method as claimed in claim 1, wherein for identifying the preform mold (13) and/or the finishing mold (14) from which the sample container has come, the sample container bearing a relief which indicates a number of the preform mold (13) and/or a number of the finishing mold (14) from which the sample container has come, or which indicates a location number, the relief being in a form of a code or alphanumerically, the method comprises:

providing a reading of the relief on the sample container and communicating the reading to the computer (38);

or analyzing the three-dimensional digital model (M) of the sample container (2), by searching for a location of a virtual relief corresponding to the relief of the sample container, and reading the virtual relief to make the virtual relief available to the computer (38).

7. The method as claimed in claim 1, further comprising extracting the sample container (2) before entry into an annealing lehr of the facility.

8. The method as claimed in claim 1, further comprising determining as another quality indicator (A) of the sample container (2) a distribution of glass of the sample container.

9. The method as claimed in claim 1, further comprising determining as another quality indicator (A) of the sample container, a number of external diameters of a body of the sample container.

10. The method as claimed in claim 8, further comprising, for determining the distribution of the glass as another quality indicator (A) of the sample container, determining a position of a center of mass (Gv) of the three-dimensional digital model (M) or of a portion of said three-dimensional digital model (M), and comparing the position of the center of mass (Gv) to a reference position (Gr).

11. The method as claimed in claim 8, further comprising, for determining the distribution of the glass as another quality indicator (A) of the sample container, determining a thickness of a glass wall over at least one region of the sample container (2), by searching in the at least one region for a position of an area with a thickness greater than a predefined value and/or a thickness less than a predefined value, and determining an extent of said area, and/or searching for a presence and a position of a place in the glass wall exhibiting a minimum or a maximum thickness in said at least one region.

12. The method as claimed in claim 8, further comprising, for determining the distribution of the glass as another quality indicator (A) of the sample container:

determining a volume of glass contained in at least two regions of the three-dimensional digital model (M) divided either by a plane of vertical section containing a virtual vertical axis of the three-dimensional digital model (M) or by a plane of horizontal section perpendicular to said virtual vertical axis; and comparing said volumes with values of reference volume and/or between several regions of the same sample container, and/or between several sample containers.

13. The method as claimed in claim 1, further comprising, for determining the rendering of reliefs (B) fashioned on the sample container as the at least one quality indicator (A) of the sample container:

positioning a section plane (C-C) on the three-dimensional digital model (M) of the sample container in such a way to select at least a part of a virtual relief (Br) of an external surface (Se) of said three-dimensional digital model (M) corresponding to the virtual relief;

determining in the section plane, a representative curve (Cr) of the section plane of the virtual relief (Br);

overlaying at least partly on the representative curve (Cr), a zero-altitude curve (Ca) representing a curve of the external surface (Se) of the sample container devoid of said virtual relief (Br); and comparing the representative curve (Cr) with the zero-altitude curve (Ca), as criterion of rendering of the virtual relief (Br) at least one of:

a distance between the representative curve (Cr) and the zero-altitude curve (Ca);

a difference in slopes at a given position between the representative curve (Cr) and the zero-altitude curve (Ca);

a variation in a slope of the representative curve (Cr); and an area delimited by the representative curve (Cr) and the zero-altitude curve (Ca).

14. The method as claimed in claim 1, further comprising, for determining the rendering of reliefs (B) fashioned on the sample container (2) as the at least one quality indicator (A) of the sample container:

determining a representative surface (Sr) of the reliefs fashioned on the sample container as a portion of an external surface of the three-dimensional digital model (M) in an area of interest containing at least a part of a virtual relief corresponding to the reliefs (B) fashioned on the sample container;

overlaying at least partly on the external surface of the area of interest, a zero-altitude surface (Sa) representing a surface of the area of interest devoid of said virtual relief; and comparing the representative surface (Sr) with the zero-altitude surface (Sa), by computing as relief rendering criterion at least one of:

a distance between the zero-altitude surface (Sa) and the representative surface (Sr);

a difference in slopes at a given position between the zero-altitude surface (Sa) and the representative surface (Sr);

a variation in slopes of the representative surface (Sr); and a number of volumes delimited by the zero-altitude surface (Sa) and the representative surface (Sr).

15. The method as claimed in claim 1, further comprising, for determining the rendering of reliefs fashioned on the sample container as the at least one quality indicator (A) of the sample container:

determining a representative surface of a virtual relief (Sr) as a portion of an external surface of the three-dimensional digital model (M) in an area of interest containing at least a part of the virtual relief corresponding to a relief fashioned on the sample container;

overlaying at least partly on the external surface of the area of interest, a theoretical relief surface (Sri) representing a surface of the area of interest if the virtual relief is correctly rendered; and comparing the representative surface (Sr) with the theoretical relief surface (Sri), by computing as relief rendering criterion at least one of:

a distance between the representative surface (Sr) and the theoretical surface (Sri);

a difference in a slope at a given position between the representative surface (Sr) and the theoretical surface (Sri); and a number of volumes delimited by the surfaces (Sr) and (Sri).

16. The method as claimed in claim 1, further comprising, for determining the rendering of reliefs fashioned on the sample container as the at least one quality indicator (A) of the sample container:

selecting, on the three-dimensional digital model (M), a virtual relief corresponding to a relief with a technical purpose, a position of which is known;

positioning a section plane to cut said virtual relief in a section plane corresponding to a design plane;

obtaining a representative curve (Cr) of a section of the virtual relief;

measuring on the representative curve (Cr) a radius of curvature and/or an angle, a length, or a distance to a zero-altitude curve (Ca); and comparing a measurement from the measuring step with predefined tolerance values.

17. The method as claimed in claim 1, further comprising, for determining the capacity (Cn) of the sample container as the at least one quality indicator (A) of the sample container:

determining an internal surface (Sf) of the three-dimensional digital model (M) of the sample container;

determining a filling level plane (Pn) on the three-dimensional digital model (M) of the sample container, the filling level plane (Pn) is either a surface plane of a virtual ring (Pr) or a nominal filling level plane; and measuring by computation an internal volume of the three-dimensional digital model (M) of the sample container delimited by the internal surface (Sf) and the filling level plane (Pn), a measurement of the measuring step being the capacity (Cn) of the sample container.

18. The method as claimed in claim 1, further comprising, for determining the volume of the envelope of the sample container as the at least one quality indicator (A) of the sample container:

determining an external surface (Se) of the three-dimensional digital model of the sample container;

determining a volume enclosing plane (Pf) as being of a ring surface plane or a lower plane of a ring mold seam; and measuring by computation an internal volume delimited by the external surface (Se) and the volume enclosing plane (Pf), a measurement of the measuring step being the volume of the envelope of the sample container.

19. The method as claimed in claim 1, further comprising, for determining the volume of the envelope of the sample container as the at least one quality indicator (A) of the sample container, determining the volume of a wall of the three-dimensional digital model (M) of the sample container.

20. The method as claimed in claim 19, further comprising:

analyzing the three-dimensional digital model (M) by searching for bubbles corresponding to a lack of material between an internal surface (Sf) and an external surface (Se), and in measuring volumes of said bubbles, which are then subtracted from a volume of a wall of the three-dimensional digital model (M), to obtain a volume corresponding to a volume of glass of the glass gob loaded into the identified preform mold, the blank of which has been transferred into the identified finishing mold from which the sample container (2) has come.

21. The method as claimed in claim 20, further comprising:

considering a measurement of the volume of glass of the glass gob loaded into the identified preform mold, as the volume of glass of the three-dimensional digital model (M), either taking the lack of material into account or not taking the lack of material into account;

considering an internal volume delimited by an external surface of the three-dimensional digital model (M) and an enclosing plane as being a measurement of the internal volume of the identified finishing mold;

considering a volume delimited by an internal surface of the three-dimensional digital model (M) and a filling level plane as being a measurement of a capacity (Cn) of the sample container;

deducing from measurements of the capacity (Cn) of the sample container and of the internal volume of the identified finishing mold, the volume of the loaded glass gob into the identified preform mold from which the sample container has come;

and deciding when the capacity of the sample container is not compliant, to modify the weight of the glass gob for the identified preform mold from which the sample container has come or to replace the identified finishing mold.

22. The method as claimed in claim 1, further comprising, for determining the internal geometry of the neck of the sample container as the at least one quality indicator (A) of the sample container:

determining, on the three-dimensional digital model (M), an internal surface corresponding at least to that of the neck;

positioning a section plane (Pg) parallel to a virtual resting plane (Pr); and measuring in the section plane several diameters of the internal surface and determining a minimum and/or a maximum in the section plane.

23. The method as claimed in claim 22, further comprising determining, as the at least one quality indicator (A) of the neck:

a diameter at a neck opening;

and/or a broaching diameter;

and/or an internal profile of the sample container.

24. The method as claimed in claim 1, further comprising, for determining the planarity of the ring surface of the sample container as the at least one quality indicator (A) of the sample container:

determining, on a basis of the three-dimensional digital model (M), a closed three-dimensional curve or an annular surface representative of the ring surface;

positioning a reference plane of the ring surface in relation to the closed three-dimensional curve or to the annular surface;

and measuring separations between the reference plane and the closed three-dimensional curve or the annular surface.

25. The method as claimed in claim 9, further comprising, for determining external diameters of a body of the sample container as the at least one quality indicator (A) of the sample container:

determining on a basis of the three-dimensional digital model (M), an external surface (Se) corresponding to at least a part of the sample container having an external diameter measurement;

positioning a section plane (Pd) parallel to a virtual resting plane (Pr) of the three-dimensional digital model (M) along at least one height of the sample container; and measuring several diameters in the section plane (Pd) with respect to the external surface and comparing the several diameter measurements with reference values.

26. A facility for forming glass containers including several separate forming sections (12), wherein each of forming sections comprises at least one preform mold and at least one finishing mold, wherein each forming section is configured so that a glass gob of molten glass (18) is initially formed into a blank in a preform mold (13), and the blank is then given a final form in a finishing mold (14), wherein the facility for forming glass containers includes a machine for controlling a process for forming glass containers, wherein the machine is arranged at an exit of the at least one finishing mold finishing mold and comprises:

a computer-assisted X-ray tomography apparatus (30) configured to take several X-ray images from different projection angles of a sample container placed on a sample holder of said computer-assisted X-ray tomography apparatus, said sample container coming from an identified preform mold and an identified finishing mold of a forming section of the facility;

a computer (38) linked to the computer-assisted X-ray tomography apparatus (30) and configured for receiving and analyzing the X-ray images of the sample container for:

constructing, in a virtual reference frame, a three-dimensional digital model (M) of the sample container from the X-ray images of the sample container; and analyzing the three-dimensional digital model (M) to measure dimensions on the three-dimensional digital model and to determine from the measured dimensions a quality indicator (A) of the sample container in relation to at least one region of the sample container and an item of adjustment information for a control parameter of the process for forming glass containers in relation with the identified finishing mold of the sample container is deducible from the container indicator;

and a system (41) for delivering the at least one quality indicator (A) of the sample container to allow corrective measures to be taken on the control parameter to correct the process for forming glass containers in relation with the identified finishing mold based on the at least one quality indicator, wherein the at least one quality indicator (A) of the sample container is selected among a group of:

at least one volume measurement of the sample container taken from among a capacity (Cry) of the sample container, a volume of an envelope of the sample container and a glass volume of the sample container, a rendering of reliefs (B) fashioned on the sample container, an internal geometry of a neck of the sample container, a planarity of a ring surface of the sample container; and wherein the facility is configured to make a correction to the control parameter of the process for forming glass containers, in relation with the identified preform mold and identified finishing mold, and based on the at least one quality indicator, among:

adjusting a weight or a shape of a subsequent glass gob loaded into the identified preform mold, adjusting a position, a speed, or a moment of arrival of the subsequent glass gob (18) upon loading of the glass gob into the identified preform mold, adjusting a synchronization or speed or force in movement of mechanisms of a blowing plunger, of the identified preform mold, of transfers of the blank, or of extracting grippers from the identified finishing mold, adjusting a cooling of the identified preform mold, identified finishing mold, or of an associated blowing plunger, adjusting a ventilation of the identified preform mold or identified finishing mold, adjusting a blowing or pressing pressure for the identified preform mold or identified finishing mold, adjusting a lubrication or greasing of the identified preform mold or identified finishing mold, adjusting a moment of blowing or a blowing time, and a vacuum in vents of the identified preform mold or the identified finishing mold, acting on a position of a deflector guiding the subsequent glass gob, replacing the identified preform mold or the identified finishing mold, and adjusting a temperature of the subsequent glass gob, of a blowing plunger and identified preform mold, a geometry of a ring mold at the identified preform mold, and a timing of compression and blowing; and wherein the facility is configured to form a subsequent glass container from the identified preform mold and the identified finishing mold, using the control parameter adjusted to correct the process for forming glass containers, wherein the facility is configured to obtain the subsequent glass container having a distribution of the glass, a capacity or a rendering of reliefs corrected compared to the sample container.

27. The facility as claimed in claim 26, wherein the system (41) for delivering at least the at least one quality indicator (A) of the sample container includes a computer connection (43) in communication with a control system (23) of a forming facility for sending to the control system (23) the at least one quality indicator (A) in relation to an identity of the identified finishing mold.

28. The facility as claimed in claim 26, wherein the machine further comprises a second system (40) configured to supply to the computer (38) a mold number or location number of the identified finishing mold from which comes the sample container (2).

29. The facility as claimed in claim 26, wherein the system (41) for delivering at least the at least one quality indicator (A) of the sample container includes a display system (42) for the at least one quality indicator (A) in relation to an identity of the identified finishing mold.

30. The method as claimed in claim 1, wherein a position of the sample container in the identified finishing mold is supplied to the computer in a mold reference frame; and the X-ray images are analyzed to determine a position of the three-dimensional digital model with respect to the position of the sample container in the mold reference frame.

* * * * *